United States Patent
Lei et al.

(10) Patent No.: US 12,232,145 B2
(45) Date of Patent: Feb. 18, 2025

(54) PDCCH MONITORING REDUCTION FOR REDUCED-CAPABILITY USER EQUIPMENTS

(71) Applicant: QUALCOMM Incorporated, San Diego, CA (US)

(72) Inventors: Jing Lei, San Diego, CA (US); Huilin Xu, San Diego, CA (US); Peter Pui Lok Ang, San Diego, CA (US); Wanshi Chen, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 17/247,204

(22) Filed: Dec. 3, 2020

(65) Prior Publication Data

US 2021/0195579 A1    Jun. 24, 2021

Related U.S. Application Data

(60) Provisional application No. 62/952,855, filed on Dec. 23, 2019.

(51) Int. Cl.
*H04W 72/51*   (2023.01)
*H04L 5/00*   (2006.01)
(Continued)

(52) U.S. Cl.
CPC .......... *H04W 72/51* (2023.01); *H04W 24/10* (2013.01); *H04W 72/23* (2023.01)

(58) Field of Classification Search
None
See application file for complete search history.

(56) References Cited

U.S. PATENT DOCUMENTS

| 2013/0208610 A1* | 8/2013 | Mach | H04W 24/10 |
| | | | 370/252 |
| 2015/0103725 A1* | 4/2015 | Sun | H04L 1/1861 |
| | | | 370/312 |

(Continued)

FOREIGN PATENT DOCUMENTS

| CN | 108886779 A | 11/2018 |
| CN | 110138500 A | 8/2019 |

(Continued)

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 16), 3GPP TS 36.300, 3GPP Draft, Draft_36300-G00, 3rd Generation Partnership Project (3GPP), Mobile Competence Centre, 650, Route Des Lucioles, F-06921 Solphia-Antinolis Cedex, France, Dec. 19, 2019 (Dec. 19, 2019). XP051841198, pp. 1-366, Retrieved from the Internet: URL:https;//ftp.39pp.org/tsg_ran/WG2_RL2/Specifications/201912_draft_specs_after_RAN_86/Draft_36300-g00.docx [Retrieved on Dec. 19, 2019] p. 198-p. 200.

(Continued)

*Primary Examiner* — Jeffrey M Rutkowski
*Assistant Examiner* — Ning Li
(74) *Attorney, Agent, or Firm* — Harrity & Harrity, LLP

(57) ABSTRACT

Various aspects of the present disclosure generally relate to wireless communication. In some aspects, a user equipment (UE) may transmit UE assistance information including UE capability report and measurement report to a base station, and the base station may determine a physical downlink control channel (PDCCH) monitoring configuration for reduced-capability UEs based at least in part on the UE assistance information. The UE may determine whether a group common PDCCH (GC-PDCCH) communication indi- (Continued)

cates that the zone identifier is activated for an associated monitoring period. The UE may selectively perform one or more PDCCH blind decodes in one or more search space sets associated with the zone identifier during the monitoring period based at least in part on determining whether the GC-PDCCH communication indicates that the zone identifier is activated for the monitoring period. Numerous other aspects are provided.

30 Claims, 11 Drawing Sheets

(51) Int. Cl.
  *H04W 8/24* (2009.01)
  *H04W 24/10* (2009.01)
  *H04W 72/23* (2023.01)

(56) References Cited

U.S. PATENT DOCUMENTS

| | | | |
|---|---|---|---|
| 2015/0264665 A1 | 9/2015 | Vos et al. | |
| 2016/0234735 A1* | 8/2016 | Kubota | H04W 48/14 |
| 2016/0242161 A1* | 8/2016 | Webb | H04L 5/0098 |
| 2017/0085345 A1 | 3/2017 | Dinan | |
| 2017/0364794 A1* | 12/2017 | Mahkonen | H04L 47/2441 |
| 2018/0098308 A1* | 4/2018 | Sun | H04L 5/0023 |
| 2018/0192403 A1* | 7/2018 | Shelby | H04L 1/0057 |
| 2019/0053159 A1* | 2/2019 | Wei | H04W 72/23 |
| 2019/0141695 A1 | 5/2019 | Babaei et al. | |
| 2019/0182702 A1* | 6/2019 | Wang | H04W 28/0221 |
| 2019/0357025 A1* | 11/2019 | Hwang | H04W 4/025 |
| 2019/0373450 A1 | 12/2019 | Zhou et al. | |
| 2020/0045674 A1* | 2/2020 | Tseng | H04W 72/048 |
| 2020/0053768 A1* | 2/2020 | Chen | H04W 72/23 |
| 2020/0067530 A1* | 2/2020 | Xu | H04L 1/0041 |
| 2020/0092814 A1* | 3/2020 | Zhou | H04L 5/0098 |
| 2020/0245389 A1* | 7/2020 | Mok | H04W 72/048 |
| 2020/0305129 A1* | 9/2020 | Lee | H04W 72/042 |
| 2020/0396760 A1* | 12/2020 | Yi | H04L 1/1864 |
| 2021/0119733 A1* | 4/2021 | Jayasinghe | H04L 1/0061 |
| 2021/0160879 A1* | 5/2021 | Lin | H04L 1/1854 |
| 2021/0184812 A1* | 6/2021 | MolavianJazi | H04W 72/048 |
| 2021/0250917 A1* | 8/2021 | Takeda | H04W 72/23 |
| 2021/0266880 A1* | 8/2021 | Horiuchi | H04L 1/001 |
| 2021/0320749 A1* | 10/2021 | Liu | H04L 1/0023 |
| 2021/0368447 A1* | 11/2021 | Kim | H04W 52/0261 |
| 2022/0039149 A1* | 2/2022 | Chen | H04W 72/20 |
| 2022/0361022 A1* | 11/2022 | Cheng | H04W 24/08 |

FOREIGN PATENT DOCUMENTS

| | | |
|---|---|---|
| TW | 201836399 A | 10/2018 |
| TW | 201944818 A | 11/2019 |
| WO | WO-2018144523 A1 | 8/2018 |

OTHER PUBLICATIONS

International Search Report and Written Opinion—PCT/US2020/064093—ISA/EPO—Mar. 30, 2021.
Mediatek Inc (Moderator): "Rel-17 UE Power Saving: Summary of Email Discussion", 3GPP Draft, RP-193089, 3GPP TSG RAN Meeting#86, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9, 2019-Dec. 12, 2019, Dec. 11, 2019 (Dec. 11, 2019), XP051839133, 28 Pages, Retrieved from the Internet: URL:https://ftp.3gpp.org/tsg_ran/TSG_RAN/TSGR_86/Docs/RP-193089.zip RP-193089_Rel-17 UE Power Saving_Summary of Email Discussion_Rev.doc [retrieved-on Dec. 11, 2019] p. 1-p. 16.
Mediatek Inc: "Structure of GC PDCCH", 3GPP Draft, R1-1713678, 3GPP TSG RAN WG1 Meeting #90, Structure of Group-Common PDCCH Final, 3rd Generation Partnership Project (3GPP), Mobile Competence Centre, 650, Route Des Lucioles, F-06921 Sophia-Antipolis Cedex, France, vol. RAN WG1, No. Prague, P.R. Czechia, Aug. 21, 2017-Aug. 25, 2017, Aug. 20, 2017 (Aug. 20, 2017), XP051316478, pp. 1-3, Retrieved from the Internet: URL:http://www.3gpp.org/ftp/Meetings_3GPP_SYNC/RAN1/Docs/ [retrieved on Aug. 20, 2017] the Whole Document.
Qualcomm Incorporated: "View on Group Scheduling for Multicast RRC_CONNECTED UEs", 3GPP Draft, R1-2009274, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), XP051946937, 7 Pages, Retrieved from the Internet: URL:https://ftp.3gpp.org/tsg_ran/WG1_RL1/TSGR1_103-e/Docs/R1-2009274.zip, R1-2009274_NR Multicast Group Scheduling for CONN_v1.doc [retrieved on Oct. 24, 2020]the whole document.
Taiwan Search Report—TW109143417—TIPO—Jan. 3, 2024.

* cited by examiner

| Field | Bitwidth |
|---|---|
| DCI Format Indicator | 1 |
| Bitmap of Activated Zones (Q Zones) | Q |
| SS Set Configuration for 1st Active Zone | $W_Q$ |
| SS Set Configuration for 2nd Active Zone | $W_Q$ |
| ... | ... |

PDCCH MONITORING REDUCTION FOR REDUCED-CAPABILITY USER EQUIPMENTS

CROSS-REFERENCE TO RELATED APPLICATION

This patent application claims priority to U.S. Provisional Patent Application No. 62/952,855, filed on Dec. 23, 2019, entitled "PDCCH MONITORING REDUCTION FOR REDUCED-CAPABILITY USER EQUIPMENTS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for physical downlink control channel monitoring reduction for reduced-capability user equipments.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting UE assistance information to a base station; receiving an indication of a zone identifier associated with a physical downlink control channel (PDCCH) monitoring configuration for radio resource control (RRC) connected reduced-capability UEs; determining whether a group common PDCCH (GC-PDCCH) communication indicates that the zone identifier is activated for an associated monitoring period; and selectively performing one or more PDCCH blind decodes in one or more search space sets associated with the zone identifier during the monitoring period based at least in part on determining whether the GC-PDCCH communication indicates that the zone identifier is activated for the monitoring period.

In some aspects, a method of wireless communication, performed by a base station (BS), may include transmitting, to a UE, a request for UE assistance information; transmitting, to the UE, an indication of a zone identifier associated with a PDCCH monitoring configuration determined for RRC connected reduced-capability UEs; transmitting a GC-PDCCH communication that indicates whether the zone identifier is activated for an associated monitoring period; and selectively transmitting, based at least in part on whether the GC-PDCCH communication indicates that the zone identifier is activated for the monitoring period, a PDCCH communication for the UE in one or more search space sets associated with the zone identifier during the monitoring period.

In some aspects, a UE for wireless communication may include memory and one or more processors operatively coupled to the memory. The memory and the one or more processors may be configured to transmit UE assistance information to a base station; receive an indication of a zone identifier associated with a PDCCH monitoring configuration for RRC connected reduced-capability UEs; determine whether a GC-PDCCH communication indicates that the zone identifier is activated for an associated monitoring period; and selectively perform one or more PDCCH blind decodes in one or more search space sets associated with the zone identifier during the monitoring period based at least in part on determining whether the GC-PDCCH communication indicates that the zone identifier is activated for the monitoring period.

In some aspects, a BS for wireless communication may include memory and one or more processors operatively coupled to the memory. The memory and the one or more processors may be configured to transmit, to a UE, a request for UE assistance information; transmit, to the UE, an indication of a zone identifier associated with a PDCCH monitoring configuration determined for RRC connected reduced-capability UEs; transmit a GC-PDCCH communication that indicates whether the zone identifier is activated for an associated monitoring period; and selectively transmit, based at least in part on whether the GC-PDCCH communication indicates that the zone identifier is activated for the monitoring period, a PDCCH communication for the UE in one or more search space sets associated with the zone identifier during the monitoring period.

In some aspects, a non-transitory computer-readable medium may store one or more instructions for wireless communication. The one or more instructions, when executed by one or more processors of a UE, may cause the one or more processors to transmit UE assistance information to a base station; receive an indication of a zone identifier associated with a PDCCH monitoring configuration for RRC connected reduced-capability UEs; determine whether a GC-PDCCH communication indicates that the zone identifier is activated for an associated monitoring period; and selectively perform one or more PDCCH blind decodes in one or more search space sets associated with the zone identifier during the monitoring period based at least in part on determining whether the GC-PDCCH communication indicates that the zone identifier is activated for the monitoring period.

In some aspects, a non-transitory computer-readable medium may store one or more instructions for wireless communication. The one or more instructions, when executed by one or more processors of a BS, may cause the one or more processors to: transmit, to a UE, a request for UE assistance information; transmit, to the UE, an indication of a zone identifier associated with a PDCCH monitoring configuration determined for RRC connected reduced-capability UEs; transmit a GC-PDCCH communication that indicates whether the zone identifier is activated for an associated monitoring period; and selectively transmit, based at least in part on whether the GC-PDCCH communication indicates that the zone identifier is activated for the monitoring period, a PDCCH communication for the UE in one or more search space sets associated with the zone identifier during the monitoring period.

In some aspects, an apparatus for wireless communication may include means for transmitting UE assistance information to a base station; means for receiving an indication of a zone identifier associated with a PDCCH monitoring configuration for RRC connected reduced-capability UEs; means for determining whether a GC-PDCCH communication indicates that the zone identifier is activated for an associated monitoring period; and means for selectively performing one or more PDCCH blind decodes in one or more search space sets associated with the zone identifier during the monitoring period based at least in part on determining whether the GC-PDCCH communication indicates that the zone identifier is activated for the monitoring period.

In some aspects, an apparatus for wireless communication may include mean for transmitting, to a UE, a request for UE assistance information; means for transmitting, to the UE, an indication of a zone identifier associated with a PDCCH monitoring configuration determined for RRC connected reduced-capability UEs; means for transmitting a GC-PDCCH communication that indicates whether the zone identifier is activated for an associated monitoring period; and means for selectively transmitting, based at least in part on whether the GC-PDCCH communication indicates that the zone identifier is activated for the monitoring period, a PDCCH communication for the UE in one or more search space sets associated with the zone identifier during the monitoring period.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
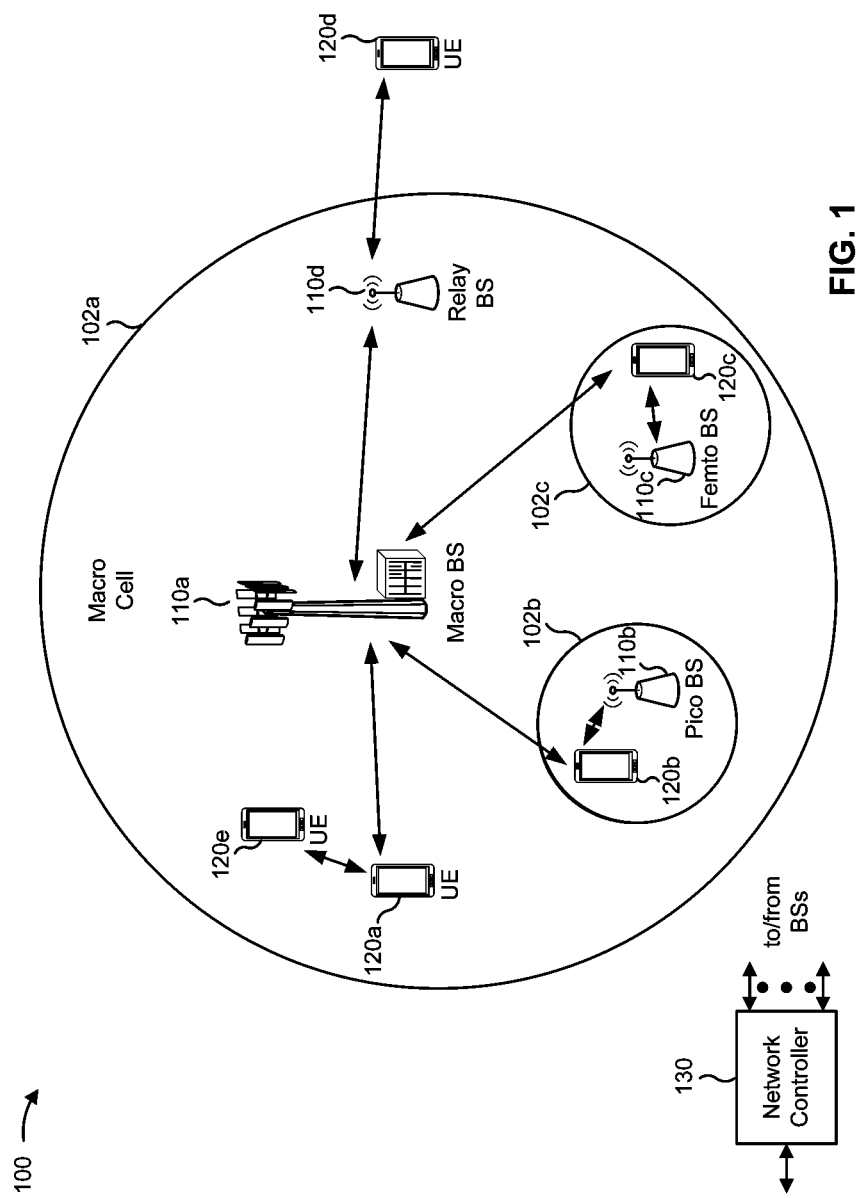
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
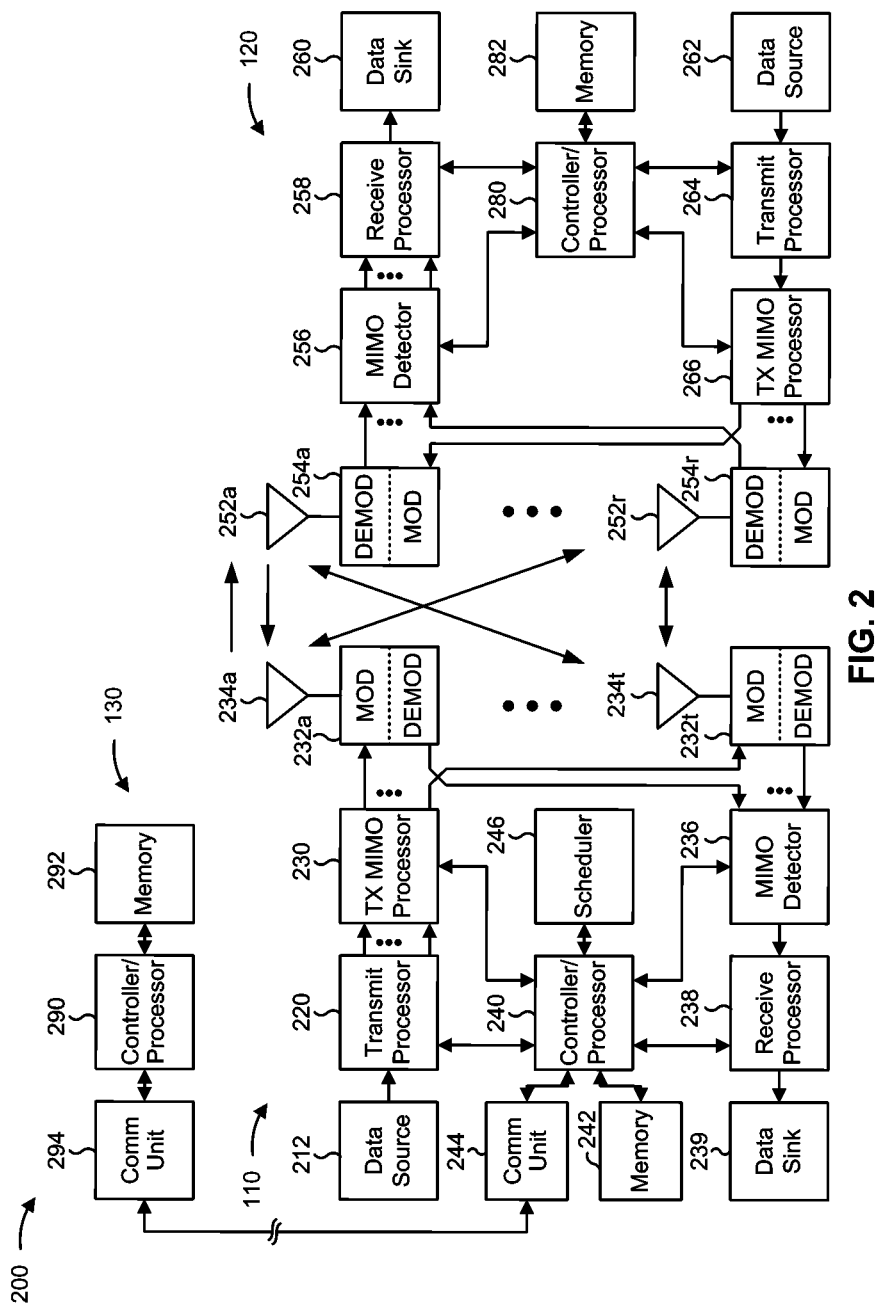
FIG. 2 is a diagram illustrating an example of a base station (BS) in communication with a user equipment (UE) in a wireless communication network, in accordance with various aspects of the present disclosure.

FIG. 2 is a diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with physical downlink control channel (PDCCH) monitoring reduction for reduced-capability UEs, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for transmitting UE assistance information to a base station 110, means for receiving an indication of a zone identifier associated with a PDCCH monitoring configuration for radio resource control (RRC) connected reduced-capability UEs, means for determining whether a group common PDCCH (GC-PDCCH) communication indicates that the zone identifier is activated for an associated monitoring period, means for selectively performing one or more PDCCH blind decodes in one or more search space sets associated with the zone identifier during the monitoring period based at least in part on determining whether the GC-PDCCH communication indicates that the zone identifier is activated for the monitoring period, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, BS 110 may include means for transmitting, to a UE 120, a request for UE assistance information, means for transmitting, to the UE 120, an indication of a zone identifier associated with a PDCCH monitoring configuration determined for RRC connected reduced-capability UEs, means for transmitting a GC-PDCCH communication that indicates whether the zone identifier is activated for an associated monitoring period, and selectively transmitting, based at least in part on whether the GC-PDCCH communication indicates that the zone identifier is activated for the monitoring period, a PDCCH communication for the UE 120 in one or more search space sets associated with the zone identifier during the monitoring period, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE may be a reduced-capability (RedCap) UE. A reduced-capability UE may be a device having reduced or lower capabilities relative to other UEs. For example, a reduced-capability UE may be equipped with fewer transmit and/or receive antennas, may be equipped with a lower-capability battery, may be equipped with fewer processing and/or memory resources (which may result in longer processing timelines), may only be capable of monitoring and/or processing a reduced frequency bandwidth, may only be capable of half-duplex frequency division duplexing, and/or the like. In some cases, a reduced-capability UE may have reduced capabilities due to a small form factor, due to keeping the cost of the reduced-capability UE low, and/or the like. Examples of reduced-capability UEs may include an IoT device, biometric sensors/devices, smart watches, smart clothing, smart glasses, smart wrist bands, smart jewelry, vehicular components or sensors (e.g., cellular-enabled onboard diagnostic (OBD) devices), smart meters/sensors, and/or the like.

A UE (e.g., a reduced-capability UE and/or other types of UEs) may be capable of performing PDCCH processing, which may include identifying and decoding PDCCH communications. In some cases, the location (e.g., the time-frequency resource location) of a PDCCH communication may not be known to a UE, in which case the UE may perform one or more PDCCH blind decodes in order to identify and decode the PDCCH communication. A PDCCH blind decode may include attempting to decode one or more time-frequency resources identified in a search space set by varying one or more parameters for the decode. As an example, for a time-frequency resource in a search space set, a UE may attempt a plurality of decodes based at least in part on different radio network temporary identifiers (RNTIs), different channel estimation parameters, assuming different payload sizes, assuming different payload content, and/or the like. However, PDCCH blind decoding may require significant processing load for UEs, and particularly for reduced-capability UEs.

Some aspects described herein provide techniques and apparatuses for PDCCH monitoring reduction for reduced-capability UEs. In some aspects, a reduced-capability UE may be configured to perform fewer PDCCH blind decodes relative to other types of UEs through the use of a zone identifier. A zone identifier may be associated with a zone of a serving cell of a UE. In this case, the serving cell may be geographically partitioned into a plurality of zones, each of which may be associated with a respective zone identifier, and each of which may be associated with a PDCCH monitoring configuration for RRC connected reduced-capability UEs. In this way, each PDCCH monitoring configuration may be configured such that reduced PDCCH monitoring parameters are reduced for reduced-capability UEs assigned to the zone. The reduced PDCCH monitoring parameters may include a reduced quantity of PDCCH blind decodes, a reduced quantity of PDCCH candidates, a smaller control resource set (CORESET), and/or other PDCCH parameters that are reduced relative to other types of UEs. The reduced PDCCH monitoring parameters reduce the processing burden of performing PDCCH blind decoding for reduced-capability UEs.

Moreover, some aspects described herein provide a hierarchical PDCCH structure for early termination of PDCCH blind decoding which reduces the processing burden of performing PDCCH blind decoding for reduced-capability UEs. In addition, some aspects described herein provide joint signaling of downlink assignments and/or uplink grants by PDCCH and PDSCH such that reduced-capability UEs are not required to increase PDCCH monitoring density to receive scheduling assignments. Still further, some aspects described herein provide a new downlink control information (DCI) format and group RNTI design for a GC-PDCCH. A BS may use the GC-PDCCH to indicate which zones are activated for an associated monitoring period. Reduced-capability UEs assigned to the activated zones may monitor search space sets, associated with the activated zones, for PDCCH communications from the BS. Reduced-capability UEs assigned to zones that are not activated by the GC-PDCCH may refrain from performing PDCCH monitoring during the associated monitoring period, thereby conserving processing and memory resources.

FIGS. 3A-3E are diagrams illustrating one or more examples 300 of PDCCH monitoring reduction for reduced-capability UEs, in accordance with various aspects of the present disclosure. As shown in FIGS. 3A-3E, example(s) 300 may include communication between a UE and a BS. The UE and the BS may be included in a wireless network, such as wireless network 100 and/or another wireless network. The UE and the BS may communicate via an access link, which may include a downlink and an uplink. In some aspects, the BS may be a serving BS or serving cell for the UE. In some aspects, the UE may be a reduced-capability UE.

Figure 3A:
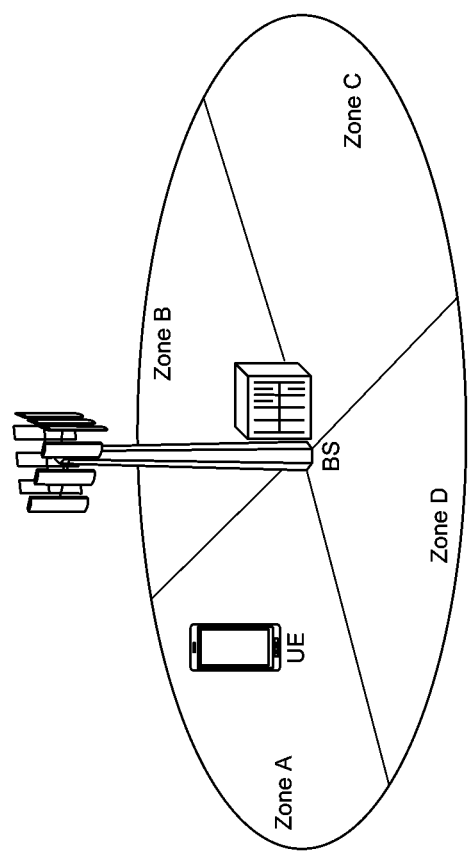
FIGS. 3A-3E are diagrams illustrating one or more examples of physical downlink control channel monitoring reduction for reduced-capability user equipments, in accordance with various aspects of the present disclosure.

As shown in FIG. 3A, the BS may configure a plurality of zones for a serving cell of the BS. The BS may configure zones for each of the serving cells of the BS. In some aspects, the zones may be geography-based. For example, and as illustrated in the example in FIG. 3A, the zones (e.g., zone A through zone D) may each be configured to cover a respective geographic area within the serving cell of the BS. In some aspects, the zones may be non-overlapping or may be at least partially overlapping. The zone configuration illustrated in FIG. 3A is an example only, and other examples of geography-based zoning may be used. For example, a serving cell may include fewer or more zones, the zones may be differently shaped, and/or the like. Other examples of geography-based zones include concentric rings or other concentric shapes that span outwardly from the BS, uniform shaped zones, non-uniform shaped zones, and/or the like. In some aspects, the BS may configure the zones based at least in part on other parameters, such as distance from the BS, interference or known obstructions within the serving cell, and/or the like.

In some aspects, the BS may configure a PDCCH monitoring configuration for each zone, and the PDCCH monitoring configurations for the zones may be configured to permit reduced PDCCH monitoring parameters for RRC connected reduced-capability UEs (e.g., reduced-capability UEs that have completed a random access channel (RACH) procedure with the BS). Each reduced-capability UE located within a zone of the BS may be assigned to the zone, or the zone assigned to a UE may be based at least in part on other parameters, such as UE capability reporting, pathloss between the UE and the BS, reference signal measurements, positioning information associated with the UE, and/or other parameters. As an example, and as illustrated in FIG. 3A, the UE may be located within zone A and, accordingly, may be assigned to zone A. In this case, the UE may perform PDCCH monitoring and processing (e.g., may perform PDCCH blind decodes and/or other types of PDCCH monitoring and processing) based at least in part on the PDCCH monitoring configuration associated with zone A.

Figure 3B:
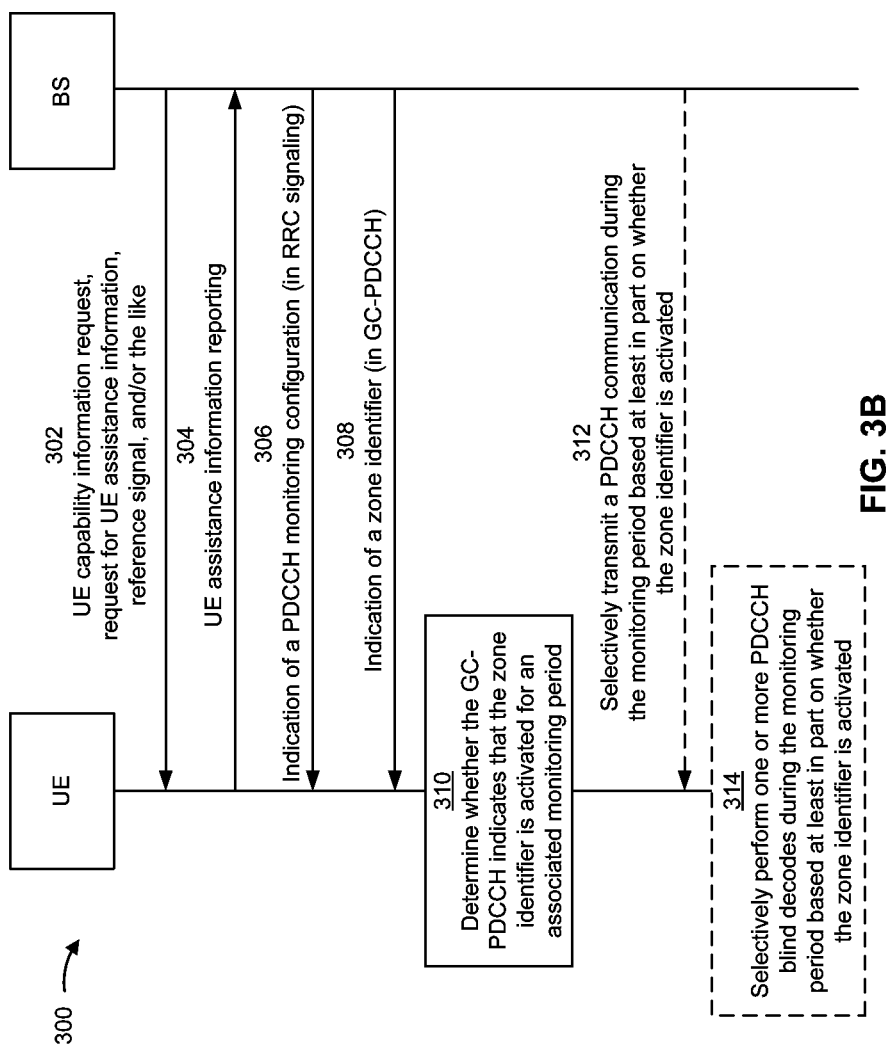

FIG. 3B illustrates one or more examples of assigning the UE to a zone. As shown in FIG. 3B, and by reference number 302, the BS may transmit a UE capability information request to the UE, may transmit a request for UE assistance information to the UE, may transmit a reference signal to the UE, may transmit a request for one or more measurements based at least in part on the reference signal, may transmit a request for positioning information associated with the UE, may transmit a request for beam management information associated with the UE, and/or the like. In some aspects, the BS may transmit the UE capability information request to the UE, the reference signal, the request for one or more measurements, the request for positioning information, and/or the request for beam management information based at least in part on the reference signal, and/or the like based at least in part on the UE and the BS completing a RACH procedure such that the UE is RRC connected with the BS.

As further shown in FIG. 3B, and by reference number 304, the UE may report the UE assistance information to the base station, which may include the UE capability information, the one or more reference signal measurements, the positioning information associated with the UE, the beam management information associated with the UE, and/or the like in a communication to the BS. The communication may include an uplink communication, a RACH communication, a physical uplink control channel (PUCCH) communication, a physical uplink shared channel (PUSCH) communication, and/or the like, which may include an uplink control information (UCI) communication, a medium access control (MAC) control element (MAC-CE) communication, an RRC communication, and/or the like.

In some aspects, the UE may transmit the UE assistance information, the UE capability information, the one or more reference signal measurements, the positioning information associated with the UE, the beam management information associated with the UE, and/or the like to the BS based at least in part on receiving a request from the BS. In some aspects, the UE may transmit the UE assistance information, the UE capability information, the one or more reference signal measurements, the positioning information associated with the UE, the beam management information associated with the UE, and/or the like to the BS based at least in part on completing a RACH procedure with the BS (e.g., without receiving a request from the BS).

In some aspects, the UE capability information may identify one or more capabilities of the UE. For example, the UE capability information may indicate that the UE is a reduced-capability UE, may indicate one or more parameters (e.g., processing power, battery capacity, memory capacity, bandwidth monitoring and processing capability, and/or the like) that may be used by the BS to determine that the UE is a reduced-capability UE, may indicate a mobility of the UE, and/or the like. In some aspects, the mobility of the UE may be indicated as a mobility level (e.g., low mobility, medium mobility, high mobility, and/or the like). The UE may determine that the UE is within a particular mobility level by determining whether mobility or movement of the UE within a particular time window (e.g., 5 minutes, 10 minutes, one hour, and/or the like) satisfies a threshold associated mobility level. In some aspects, the mobility of the UE may be indicated by actual values of mobility measurements performed by the UE, such as positioning measurements, global positioning system (GPS) coordinates, and/or the like.

In some aspects, the reference signal transmitted from the BS and measured by the UE may include a channel state information reference signal (CSI-RS), a demodulation reference signal (DMRS), a synchronization signal block (SSB), a phase tracking reference signal (PTRS), and/or other types of reference signals. In some aspects, the one or more measurements may include RSRP measurements, RSSI measurements, RSRQ measurements, CQI measurements, signal to noise ratio (SNR) measurements, signal to interference plus noise ratio (SINR) measurements, pathloss measurements, latency measurements, and/or the like.

The BS may receive the UE capability information, the one or more reference signal measurements, the positioning information associated with the UE, the beam management information associated with the UE, and/or the like from the UE and may assign the UE to a zone based at least in part on the UE capability information, the one or more reference signal measurements, the positioning information associated with the UE, the beam management information associated with the UE, and/or the like. For example, the BS may assign the UE to a zone based at least in part on the UE capability information indicating that the UE is a reduced-capability UE (or based at least in part on determining that the UE is a reduced-capability UE based at least in part on the UE capability information). As another example, the BS may assign the UE to a zone based at least in part on the positioning information and/or reference signal measurements indicating that the UE is located within the zone.

In some aspects, the BS may assign the UE to one zone or a plurality of zones based at least in part on the mobility of the UE. For example, if the UE capability information indicates that the UE is a low mobility UE, the BS may assign the UE to one zone. As another example, if the UE capability information indicates that the UE is a medium mobility UE or a high mobility UE, the BS may assign the UE to a plurality of zones (e.g., adjacent zones, non-adjacent zones, and/or the like) to reduce the amount of signaling needed to switch the zone to which the UE is assigned when the UE moves between zones.

As further shown in FIG. 3B, and by reference number 306, the BS may transmit, to the UE, an indication of a PDCCH monitoring configuration (e.g., in RRC signaling). The PDCCH monitoring configuration may identify a zone identifier associated with the zone to which the UE is assigned. In some aspects, if the UE is assigned to a plurality of zones, the BS may transmit an indication of a plurality of zone identifiers, where each zone identifier is associated with a respective zone of the plurality of zones.

In some aspects, the zone and associated zone identifier assigned to the UE may be semi-persistently configured for the UE by dedicated RRC signaling. In some aspects, the UE may receive the RRC signaling based at least in part on transmitting, to the BS, the communication that includes the UE capability information, the one or more reference signal measurements, the positioning information associated with the UE, the beam management information associated with the UE, and/or the like. In some aspects, the RRC signaling may further identify a zone index associated with the zone, a zone RNTI (Z-RNTI) associated with the zone (e.g., which may be an RNTI introduced for transmitting and receiving communications zone specific to zones), and/or the like.

In some aspects, the BS may use downlink signaling to dynamically activate and/or deactivate zones for reduced-capability UEs assigned to the zones. In this case, if a zone is activated, the reduced-capability UEs assigned to the zone are to perform PDCCH monitoring (e.g., perform PDCCH blind decodes and/or PDCCH monitoring and processing techniques) for PDCCH communications from the BS during a monitoring period. Conversely, if a zone is not activated, the reduced-capability UEs assigned to the zone may refrain from performing PDCCH monitoring during a monitoring period, thereby conserving processing, memory, and battery resources.

As further shown in FIG. 3B, and by reference number 308, to activate one or more zones and/or to transmit other zone-specific signaling, the BS may transmit an indication of a zone identifier in a GC-PDCCH communication to reduced-capability UEs assigned to at least one zone of the BS. The GC-PDCCH communication may indicate which zones of the BS are activated for a monitoring period associated with the GC-PDCCH communication. Moreover, the GC-PDCCH communication may indicate search space set configurations for each of the activated zones. The search space set configuration for a zone may identify the search space sets that are to be PDCCH monitored by reduced-capability UEs assigned to the zone.

As further shown in FIG. 3B, and by reference number 310, the UE may receive the GC-PDCCH communication and may determine whether the GC-PDCCH communication indicates that the zone identifier associated with the zone to which the UE is assigned is activated for an associated monitoring period. In some aspects, the UE may determine whether the GC-PDCCH communication indicates that the zone identifier associated with the zone to which the UE is assigned is activated by determining whether the GC-PDCCH communication identifies the zone identifier associated with the zone, by determining whether the GC-PDCCH communication identifies the zone index associated with the zone, by determining whether the GC-PDCCH communication identifies the Z-RNTI associated with the zone, and/or the like.

As further shown in FIG. 3B, and by reference number 312, the BS may selectively transmit a PDCCH communication to the UE during the monitoring period associated with the GC-PDCCH communication based at least in part on whether the zone identifier associated with the zone to which the UE is assigned is activated for the monitoring period. The BS may perform similar actions for other reduced-capability UEs assigned to zones in the serving cell of the BS. As an example, if the zone identifier associated with the zone to which the UE is assigned is activated, the BS may transmit a PDCCH communication to the UE during the monitoring period. As another example, if the zone identifier associated with the zone to which the UE is assigned is not activated, the BS may refrain from transmitting a PDCCH communication to the UE during the monitoring period.

As further shown in FIG. 3B, and by reference number 314, the UE may selectively perform PDCCH monitoring (e.g., may selectively perform one or more PDCCH blind decodes) during the monitoring period based at least in part on whether the GC-PDCCH communication indicates that the zone identifier associated with the zone to which the UE is assigned is activated. If the UE determines that the zone identifier associated with the zone to which the UE is assigned is not activated, the UE may refrain from performing PDCCH monitoring during the monitoring period, which may conserve processing, memory, and battery resources of the UE.

If the UE determines that the zone identifier associated with the zone to which the UE is assigned is activated, the UE may perform PDCCH monitoring (e.g., may selectively perform one or more PDCCH blind decodes) during the monitoring period. In this case, the UE may perform the one or more PDCCH blind decodes in each of the search space sets, configured for the zone, indicated in the GC-PDCCH communication. The monitoring period may include one or more contiguous slots, one or more contiguous symbols, one or more contiguous subframes, and/or other types of time-domain resources, and may include one or more resource blocks, one or more resource elements, one or more sub-carriers, and/or other types of frequency-domain resources.

In some aspects, the UE may perform the one or more PDCCH blind decodes based at least in part on the PDCCH monitoring configuration associated with the zone to which the UE is assigned. The PDCCH monitoring configuration may identify one or more PDCCH monitoring parameters, and the UE may perform the one or more PDCCH blind decodes based at least in part on the PDCCH monitoring parameters. The PDCCH monitoring parameters may include, for example, a controlResourceSetID parameter that indicates CORESETs that the UE is to monitor during the monitoring period. The bandwidth of the CORESETs may be reduced relative to other types of UEs. As another example, the PDCCH monitoring parameters may include a monitoringSlotPeriodicityAndOffset parameter that indicates a periodicity and an offset for one or more slots of the monitoring period in which the UE is to perform PDCCH monitoring.

As another example, the PDCCH monitoring parameters may include a PDCCH duration parameter that indicates a duration in symbols of a PDCCH for which the UE is to perform PDCCH monitoring during the monitoring period. As another example, the PDCCH monitoring parameters may include a monitoringSymbolsWithinSlot parameter that indicates a quantity of symbols within each slot in the monitoring period for which the UE is to perform PDCCH monitoring. As another example, the PDCCH monitoring parameters may include an nrofCandidates parameter that indicates a quantity of PDCCH candidates configured for the UE (e.g., a quantity of PDCCH candidates for which the UE is to perform PDCCH blind decodes). The nrofCandidates parameter may be configured such that the quantity of PDCCH blind decodes is reduced relative to other types of UEs such that PDCCH monitoring parameters for reduced-capability UEs assigned to the zone are reduced. As another example, the PDCCH monitoring parameters may include a searchSpaceType parameter that indicates a search space type for the one or more search space sets associated with the zone.

Figure 3C:
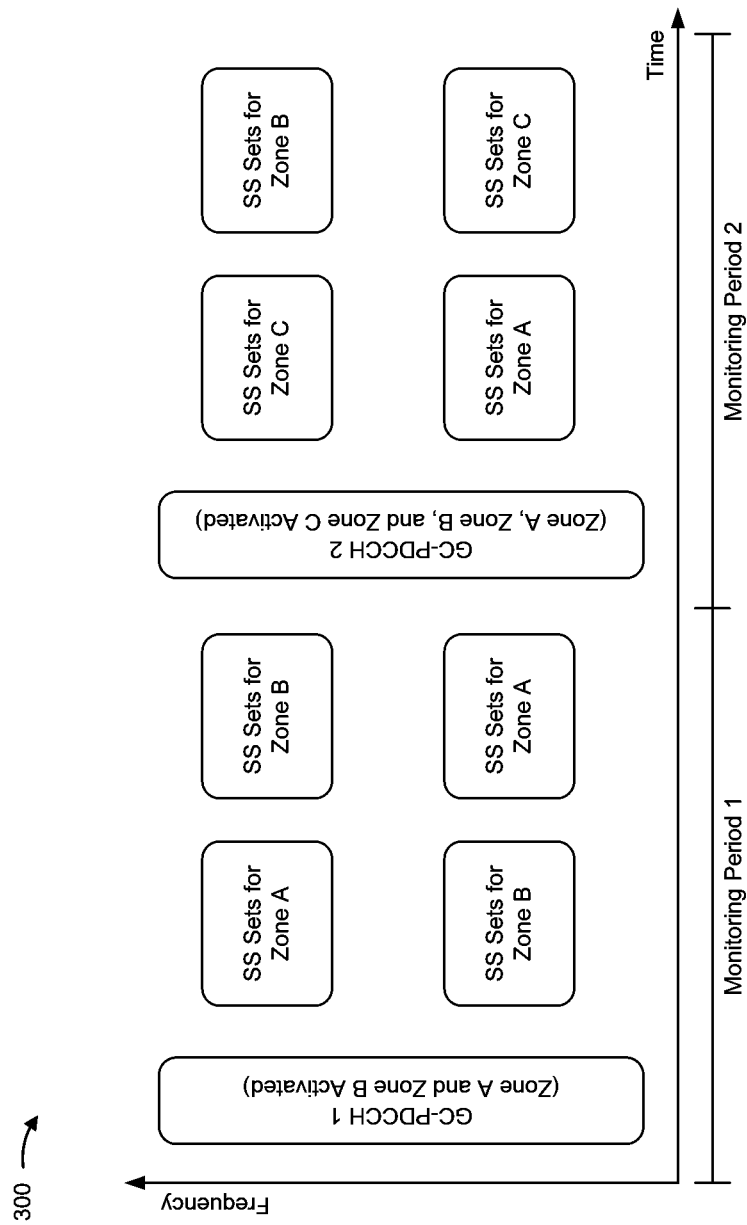

FIG. 3C illustrates example configurations of monitoring periods for various zones of a BS. Other configurations for monitoring periods may be used. As shown in FIG. 3C, the BS may transmit a first GC-PDCCH communication (indicated as GC-PDCCH 1 in FIG. 3C) for a first monitoring period (indicated as monitoring period 1 in FIG. 3C). The first GC-PDCCH communication may indicate that zone A and zone B are activated for the first monitoring period. Moreover, the first GC-PDCCH communication may identify the search space sets (SS sets) for each zone for which UEs assigned to zone A and to zone B are to perform PDCCH monitoring during the first monitoring period. In this case, the BS may transmit PDCCH communications to reduced-capability UEs assigned to zone A in the search space sets for zone A, may transmit PDCCH communications to reduced-capability UEs assigned to zone B in the search space sets for zone B, and/or the like. Moreover, the reduced-capability UEs assigned to zone A may perform PDCCH monitoring (e.g., PDCCH blind decodes and/or other PDCCH processing techniques) in the search space sets for zone A, the reduced-capability UEs assigned to zone B may perform PDCCH monitoring in the search space sets for zone B, and/or the like.

As further shown in FIG. 3C, the BS may transmit a second GC-PDCCH communication (indicated as GC-PDCCH 2 in FIG. 3C) for a second monitoring period (indicated as monitoring period 2 in FIG. 3C). The second GC-PDCCH communication may indicate that zone A, zone B, and zone C are activated for the second monitoring period. Moreover, the second GC-PDCCH communication may identify the search space sets (SS sets) for each zone for which UEs assigned to zones A, zone B, and zone C are to perform PDCCH monitoring during the second monitoring period. In this case, the BS may transmit PDCCH communications to reduced-capability UEs assigned to zone A in the search space sets for zone A, may transmit PDCCH communications to reduced-capability UEs assigned to zone B in the search space sets for zone B, may transmit PDCCH communications to reduced-capability UEs assigned to zone C in the search space sets for zone C and/or the like. Moreover, the reduced-capability UEs assigned to zone A may perform PDCCH monitoring (e.g., PDCCH blind decodes and/or other PDCCH processing techniques) in the search space sets for zone A, the reduced-capability UEs assigned to zone B may perform PDCCH monitoring in the search space sets for zone B, the reduced-capability UEs assigned to zone C may perform PDCCH monitoring in the search space sets for zone C, and/or the like.

In some aspects, the BS may transmit fewer or greater quantities of GC-PDCCH communications. In some aspects, the BS may transmit different configurations of GC-PDCCH communications for fewer or greater quantities of zones. In some aspects, the BS may configure different configurations of search space sets for various zones across different GC-PDCCH communications.

Figure 3D:
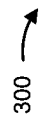

FIG. 3D illustrates an example DCI format that is introduced for a GC-PDCCH communication that may be used for activating zones. As shown in FIG. 3D, the example DCI format may include a DCI format indicator field having a bitwidth of 1 bit. The value of the DCI format indicator field may indicate the DCI format of the GC-PDCCH communication. In this case, the BS may configure the value of the DCI format indicator field to indicate that the GC-PDCCH communication is for zone activation.

As further shown in FIG. 3D, the example DCI format may include a bitmap of activated zones field, which may include a bitwidth of Q for Q zones. Each bit in the bitmap may correspond to a respective zone index, zone identifier, or Z-RNTI of the Q zones. The value of a bit in the bitmap may indicate whether an associated zone index, zone identifier, or Z-RNTI is activated. As an example, a 1-value bit may indicate that an associated zone index, zone identifier, or Z-RNTI is activated, whereas a 0-value bit may indicate that an associated zone index, zone identifier, or Z-RNTI is not activated. In some aspects, the bit value assignments may be reversed or may be configured in another configuration.

As further shown in FIG. 3D, the example DCI format may include fields for search space set configurations for each of the activated zones. In this case, each search space set configuration field may have a bitwidth of WQ bits. In some aspects, Q and WQ may be configured by RRC signaling. The WQ bits of a search space set configuration field associated with a zone may indicate search space sets that are to be PDCCH monitored for the reduced-capability UEs assigned to the zone during an associated monitoring period.

In some cases, due to the reduced bandwidth capability of reduced-capability UEs, there may be a frequency-domain limitation for PDCCH monitoring for the UE. However, increasing the time-domain density of PDCCH monitoring for the UE may result in greater power consumption and/or processing complexity.

Figure 3E:
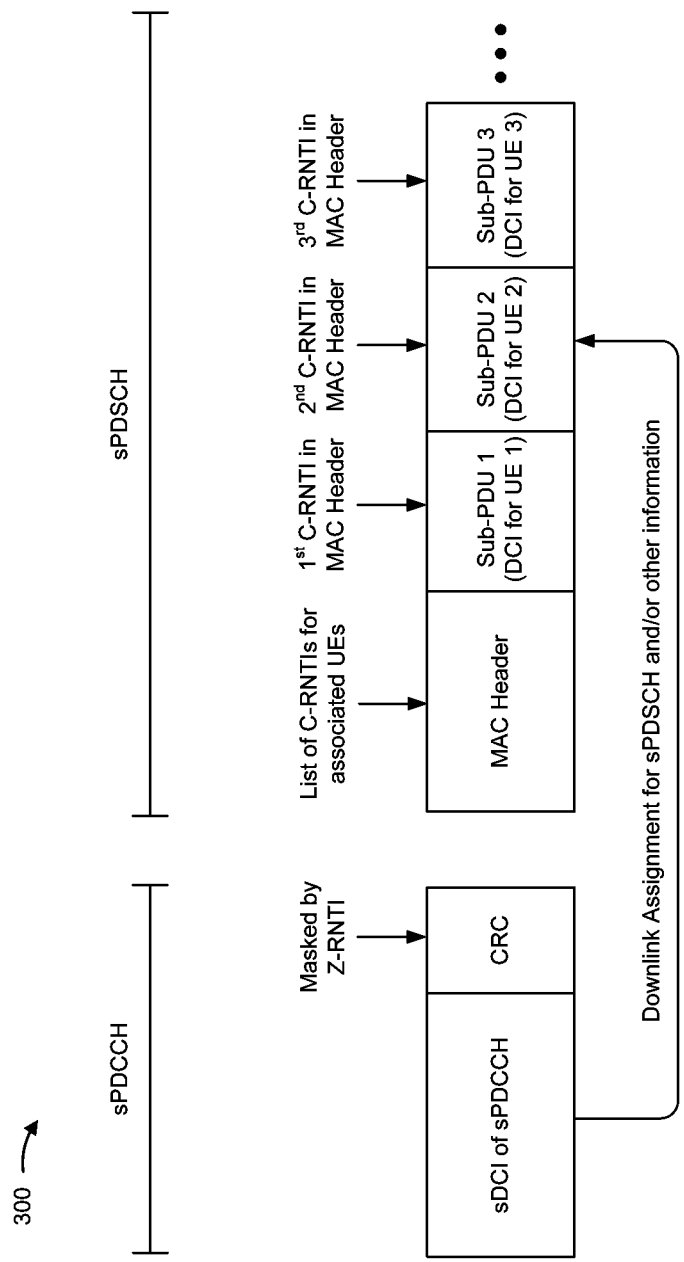

As shown in FIG. 3E, the BS may implement a channel structure in which a downlink assignment and/or an uplink grant for the UE may be jointly signaled by a short PDCCH (sPDCCH) communication and a short PDSCH (sPDSCH) communication. In some aspects, the sPDCCH may be a PDCCH communication that is transmitted to the UE and other reduced-capability UEs in a search space set associated with a zone to which the UE and the other reduced-capability UEs are assigned. The sPDCCH communication and the sPDSCH communication may respectively include fewer bits relative to a full-sized PDCCH communication and a full-sized PDSCH communication.

As shown in FIG. 3E, the sPDCCH communication may include short DCI (e.g., DCI that includes fewer bits relative to a full-sized DCI) that may include information identifying a downlink assignment for an associated sPDSCH and/or other information for the UE and the other reduced-capability UEs. In some aspects, the cyclic redundancy check (CRC) of the sPDCCH communication may be masked by a group RNTI, such as the Z-RNTI associated with the zone to which the UE and the other reduced-capability UEs are assigned. In some aspects, the UE may identify the sPDCCH communication by performing a PDCCH blind decode (e.g., during a monitoring period) in a search space set associated with the zone to which the UE is assigned, may identify the downlink assignment indicated in the sDCI of the sPDCCH communication, and may identify the sPDCCH communication based at least in part on the downlink assignment.

As further shown in FIG. 3E, the sPDSCH communication may include a MAC header and an aggregation of a plurality of MAC sub-protocol data units (sub-PDUs). The MAC header may identify a list of respective cell radio network temporary identifiers (C-RNTIs) for each of the UE and the other reduced-capability UEs which are expected to receive a DCI communication. In some aspects, an ordering of the respective C-RNTIs in the MAC header of sPDSCH is consistent with an ordering of the MAC sub-PDUs in the sPDSCH communication. In this case, the UE may analyze the MAC header to identify the C-RNTI assigned to the UE, and may determine the location of the MAC sub-PDU in the sPDSCH communication based at least in part on the ordering of the C-RNTIs in the MAC header.

As further shown in FIG. 3E, each MAC sub-PDU may carry a DCI communication for a UE assigned to the C-RNTI associated with the MAC sub-PDU. In this case, the UE may receive the DCI communication in the MAC sub-PDU associated with the C-RNTI of the UE, and the UE may identify one or more other downlink assignments for the UE and/or one or more uplink grants for the UE identified in the DCI communication.

In this way, reduced-capability UEs may be configured to perform fewer PDCCH blind decodes relative to other types of UEs through the use of a zone identifier. Zones and associated zone identifiers may be associated with PDCCH monitoring configurations that include reduced PDCCH monitoring parameters for reduced-capability UEs assigned to the zones. The reduced PDCCH monitoring parameters may include a reduced quantity of PDCCH blind decodes, a reduced quantity of PDCCH candidates, smaller CORE-SETs, and/or other PDCCH parameters that are reduced relative to other types of UEs. The reduced PDCCH monitoring parameters reduce the processing burden of performing PDCCH blind decoding for reduced-capability UEs.

As indicated above, FIGS. 3A-3E are provided as one or more examples. Other examples may differ from what is described with respect to FIGS. 3A-3E.

Figure 4:
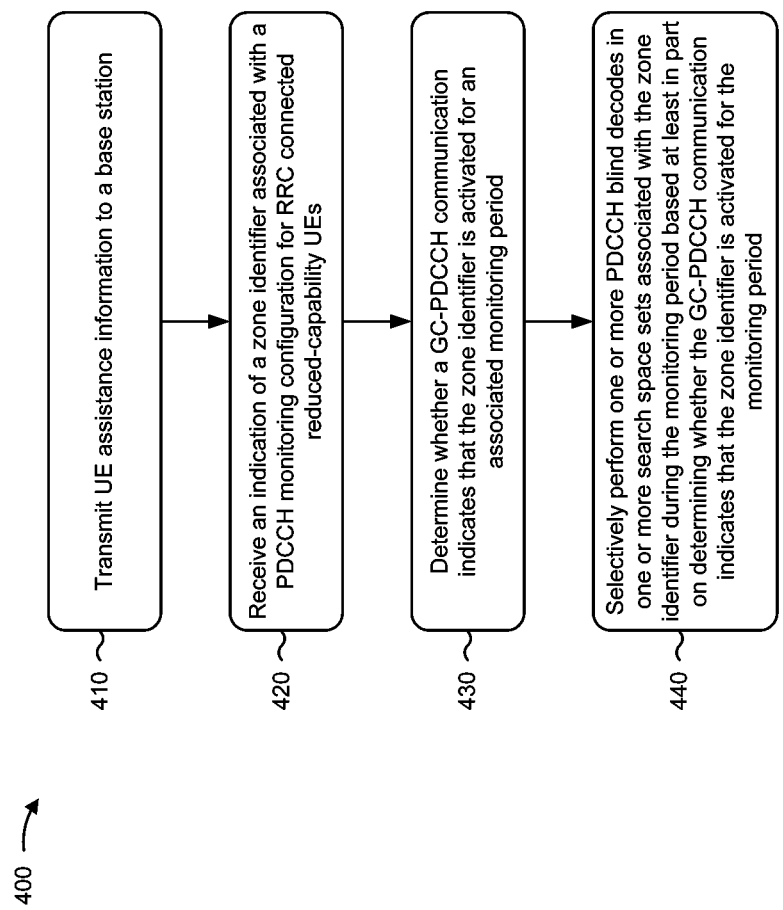
FIG. 4 is a diagram illustrating an example process performed, for example, by a UE, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120) performs operations associated with PDCCH monitoring reduction for reduced-capability UEs.

As shown in FIG. 4, in some aspects, process 400 may include transmitting UE assistance information to a base station (block 410). For example, the UE (e.g., using receive processor 258, transmit processor 264, controller/processor 280, memory 282, and/or the like) may transmit UE assistance information to a base station, as described above.

As further shown in FIG. 4, in some aspects, process 400 may include receiving an indication of a zone identifier associated with a PDCCH monitoring configuration for RRC connected reduced-capability UEs (block 420). For example, the UE (e.g., using receive processor 258, transmit processor 264, controller/processor 280, memory 282, and/or the like) may receive an indication of a zone identifier associated with a PDCCH monitoring configuration for RRC connected reduced-capability UEs, as described above.

As further shown in FIG. 4, in some aspects, process 400 may include determining whether a GC-PDCCH communication indicates that the zone identifier is activated for an associated monitoring period (block 430). For example, the UE (e.g., using receive processor 258, transmit processor 264, controller/processor 280, memory 282, and/or the like) may determine whether a GC-PDCCH communication indicates that the zone identifier is activated for an associated monitoring period, as described above.

As further shown in FIG. 4, in some aspects, process 400 may include selectively performing one or more PDCCH blind decodes in one or more search space sets associated with the zone identifier during the monitoring period based at least in part on determining whether the GC-PDCCH communication indicates that the zone identifier is activated for the monitoring period (block 440). For example, the UE (e.g., using receive processor 258, transmit processor 264, controller/processor 280, memory 282, and/or the like) may selectively perform one or more PDCCH blind decodes in one or more search space sets associated with the zone identifier during the monitoring period based at least in part on determining whether the GC-PDCCH communication indicates that the zone identifier is activated for the monitoring period, as described above.

Process 400 may include additional aspects, such as any single aspect or any combination of aspects described below and/or in connection with one or more other processes described elsewhere herein.

In a first aspect, the zone identifier is one of a plurality of zone identifiers configured for a serving cell of the base station to which the UE is communicatively connected. In a second aspect, alone or in combination with the first aspect, the PDCCH monitoring configuration is based at least in part on the UE assistance information requested by the base station, and the PDCCH monitoring configuration includes at least one of a controlResourceSetID parameter that indicates one or more control resource sets that the UE is to monitor, a monitoringSlotPeriodicityAndOffset parameter that indicates a periodicity and an offset for one or more slots in which the UE is to perform PDCCH monitoring, a PDCCH duration parameter that indicates a duration in symbols of a PDCCH for which the UE is to perform PDCCH monitoring, a monitoringSymbolsWithinSlot parameter that indicates a quantity of symbols within each slot in which the UE is to perform PDCCH monitoring, an nrofCandidates parameter that indicates a quantity of PDCCH candidates configured for the UE, or a searchSpaceType parameter that indicates a search space type for the one or more search space sets associated with the zone identifier.

In a third aspect, alone or in combination with one or more of the first and second aspects, transmitting the UE assistance information includes transmitting, based at least in part on receiving a request from the base station, the UE assistance information, where the UE assistance information identifies at least one of UE capability information associated with the UE, one or more reference signal measurements, positioning information associated with the UE, one or more pathloss measurements, or beam management information associated with the UE, and receiving the indication of the zone identifier comprises receiving the indication of the zone identifier based at least in part on transmitting the communication, wherein the zone identifier is semi-persistently configured for the UE by dedicated radio resource control signaling.

In a fourth aspect, alone or in combination with one or more of the first through third aspects, transmitting the communication comprises transmitting the communication based at least in part on receiving a request from the base station. In a fifth aspect, alone or in combination with one or more of the first through fourth aspects, receiving the indication of the zone identifier comprises receiving the indication of the zone identifier based at least in part on transmitting a UE capability report to the base station, wherein the UE capability report indicates a low mobility for the UE.

In a sixth aspect, alone or in combination with one or more of the first through fifth aspects, receiving the indication of the zone identifier comprises receiving an indication of a plurality of zone identifiers based at least in part on transmitting a UE capability report to the base station, wherein the UE capability report indicates a high mobility for the UE. In a seventh aspect, alone or in combination with one or more of the first through sixth aspects, the zone identifier is associated with a zone index or a Z-RNTI, and determining whether the GC-PDCCH communication indicates that the zone identifier is activated for the associated monitoring period comprises determining whether the GC-PDCCH communication indicates that the Z-RNTI associated with the zone identifier is activated for the associated monitoring period.

In an eighth aspect, alone or in combination with one or more of the first through seventh aspects, determining whether the group common PDCCH communication indicates that the zone identifier is activated for the monitoring period comprises determining that the GC-PDCCH communication does not indicate that the zone identifier is activated for the monitoring period, and selectively performing the one or more PDCCH blind decodes in the one or more search space sets associated with the zone identifier during the monitoring period comprises refraining from performing the one or more PDCCH blind decodes during the monitoring period based at least in part on determining that the GC-PDCCH communication does not indicate that the zone identifier is activated for the monitoring period.

In a ninth aspect, alone or in combination with one or more of the first through eighth aspects, determining whether the group common PDCCH communication indicates that the zone identifier is activated for the monitoring period comprises determining, based at least in part on a bitmap indicating activation information for a plurality of zone identifiers, that the GC-PDCCH communication indicates that a zone associated with the zone identifier is activated for the monitoring period, and selectively performing the one or more PDCCH blind decodes in the one or more search space sets associated with the zone during the monitoring period comprises performing the one or more PDCCH blind decodes in the one or more search space sets associated with the zone identifier during the monitoring period based at least in part on determining that the GC-PDCCH communication indicates that the zone identifier is activated for the monitoring period.

In a tenth aspect, alone or in combination with one or more of the first through ninth aspects, performing one or more PDCCH blind decodes in the one or more search space sets associated with the zone identifier during the monitoring period comprises performing one or more PDCCH blind decodes based at least in part on the PDCCH configuration associated with the zone identifier. In an eleventh aspect, alone or in combination with one or more of the first through tenth aspects, process 400 includes identifying an sPDCCH communication based at least in part on performing a PDCCH blind decode of the one or more PDCCH blind decodes in a search space set of the one or more search space sets and identifying, based at least in part on the sPDCCH communication, a downlink assignment for an sPDSCH communication.

In a twelfth aspect, alone or in combination with one or more of the first through eleventh aspects, process 400 includes identifying the sPDSCH communication based at least in part on a downlink assignment and identifying, based at least in part on the sPDSCH communication, at least one of: one or more other downlink assignments for the UE, or one or more uplink grants for the UE. In a thirteenth aspect, alone or in combination with one or more of the first through twelfth aspects, identifying the downlink assignment for the sPDSCH communication comprises identifying an indication of the downlink assignment for the sPDSCH communication in sDCI included in the sPDCCH communication.

In a fourteenth aspect, alone or in combination with one or more of the first through thirteenth aspects, a cyclic redundancy check of the sPDSCH communication is masked by a group radio network temporary identifier associated with the UE. In a fifteenth aspect, alone or in combination with one or more of the first through fourteenth aspects, the sPDSCH communication comprises a MAC header that identifies respective C-RNTIs for each of the UE and a plurality of other UEs which are expected to receive a DCI communication, and an aggregation of MAC sub-PDUs, wherein each of the MAC sub-PDUs carries a DCI communication for the UE or one of the plurality of other UEs, and wherein an ordering of respective C-RNTIs in the MAC header of sPDSCH is consistent with an ordering of the MAC sub-PDUs.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
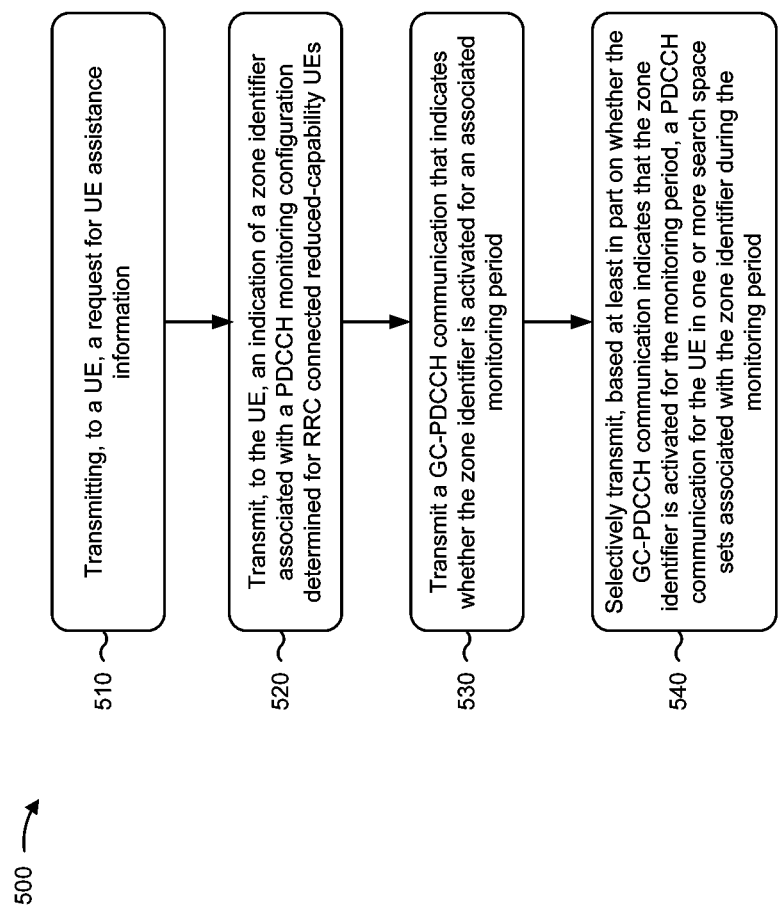
FIG. 5 is a diagram illustrating an example process performed, for example, by a BS, in accordance with various aspects of the present disclosure.

FIG. 5 is a diagram illustrating an example process 500 performed, for example, by a BS, in accordance with various aspects of the present disclosure. Example process 500 is an example where the BS (e.g., BS 110) performs operations associated with PDCCH monitoring reduction for reduced-capability UEs.

As shown in FIG. 5, in some aspects, process 500 may include transmitting, to a UE, a request for UE assistance information (block 510). For example, the BS (e.g., using transmit processor 220, receive processor 238, controller/processor 240, memory 242, and/or the like) may transmit, to a UE, a request for UE assistance information, as described above.

As shown in FIG. 5, in some aspects, process 500 may include transmitting, to the UE, an indication of a zone identifier associated with a PDCCH monitoring configuration determined for RRC connected reduced-capability UEs (block 520). For example, the BS (e.g., using transmit processor 220, receive processor 238, controller/processor 240, memory 242, and/or the like) may transmit, to the UE, an indication of a zone identifier associated with a PDCCH monitoring configuration determined for RRC connected reduced-capability UEs, as described above.

As further shown in FIG. 5, in some aspects, process 500 may include transmitting a GC-PDCCH communication that indicates whether the zone identifier is activated for an associated monitoring period (block 530). For example, the BS (e.g., using transmit processor 220, receive processor 238, controller/processor 240, memory 242, and/or the like) may transmit a GC-PDCCH communication that indicates whether the zone identifier is activated for an associated monitoring period, as described above.

As further shown in FIG. 5, in some aspects, process 500 may include selectively transmitting, based at least in part on whether the GC-PDCCH communication indicates that the zone identifier is activated for the monitoring period, a PDCCH communication for the UE in one or more search space sets associated with the zone identifier during the monitoring period (block 540). For example, the BS (e.g., using transmit processor 220, receive processor 238, controller/processor 240, memory 242, and/or the like) may selectively transmit, based at least in part on whether the GC-PDCCH communication indicates that the zone identifier is activated for the monitoring period, a PDCCH communication for the UE in one or more search space sets associated with the zone identifier during the monitoring period, as described above.

Process 500 may include additional aspects, such as any single aspect or any combination of aspects described below and/or in connection with one or more other processes described elsewhere herein.

In a first aspect, the zone identifier is one of a plurality of zone identifiers configured for a serving cell of the base station. In a second aspect, alone or in combination with the first aspect, determining the PDCCH monitoring configuration is based at least in part on the UE assistance information, where the PDCCH monitoring configuration includes at least one of a controlResourceSetID parameter that indicates one or more CORESETs that the UE is to monitor, a monitoringSlotPeriodicityAndOffset parameter that indicates a periodicity and an offset for one or more slots in which the UE is to perform PDCCH monitoring, a PDCCH duration parameter that indicates a duration in symbols of a PDCCH for which the UE is to perform PDCCH monitoring, a monitoringSymbolsWithinSlot parameter that indicates a quantity of symbols within each slot in which the UE is to perform PDCCH monitoring, a nrofCandidates parameter that indicates a quantity of PDCCH candidates configured for the UE, or a searchSpaceType parameter that indicates a search space type for the one or more search space sets associated with the zone identifier.

In a third aspect, alone or in combination with one or more of the first and second aspects, process 500 includes receiving, from the UE, a communication that identifies at least one of UE capability information associated with the UE, one or more reference signal measurements, positioning information associated with the UE, one or more pathloss measurements, or beam management information associated with the UE, and transmitting the indication of the zone identifier comprises transmitting the indication of the zone identifier based at least in part on receiving the communication, wherein the zone identifier is semi-persistently configured for the UE by dedicated radio resource control signaling.

In a fourth aspect, alone or in combination with one or more of the first through third aspects, receiving the communication comprises receiving the communication based at least in part on transmitting a request to the UE. In a fifth aspect, alone or in combination with one or more of the first through fourth aspects, transmitting the indication of the zone identifier comprises transmitting the indication of the zone identifier based at least in part on receiving a UE capability report from the UE, wherein the UE capability report indicates a low mobility for the UE.

In a sixth aspect, alone or in combination with one or more of the first through fifth aspects, transmitting the indication of the zone identifier comprises transmitting an indication of a plurality of zone identifiers for the UE based at least in part on receiving a UE capability report from the UE, wherein the UE capability report indicates a high mobility for the UE. In a seventh aspect, alone or in combination with one or more of the first through sixth aspects, the zone identifier is associated with a zone index or a Z-RNTI, and the GC-PDCCH communication indicates whether the associated zone identifier is activated for the associated monitoring period by indicating whether the zone index or Z-RNTI associated with the zone identifier is activated for the associated monitoring period.

In an eighth aspect, alone or in combination with one or more of the first through seventh aspects, the GC-PDCCH communication does not indicate that the zone identifier is activated for the monitoring period, and selectively transmitting the PDCCH communication in the one or more search space sets associated with the zone identifier during the monitoring period comprises refraining from transmitting the PDCCH communication during the monitoring period. In a ninth aspect, alone or in combination with one or more of the first through eighth aspects, the GC-PDCCH communication indicates that the zone identifier is activated for the monitoring period, and selectively transmitting the PDCCH communication in the one or more search space sets associated with the zone identifier during the monitoring period comprises transmitting the PDCCH communication in the one or more search space sets associated with the zone identifier during the monitoring period.

In a tenth aspect, alone or in combination with one or more of the first through ninth aspects, transmitting the PDCCH communication comprises transmitting the PDCCH communication based at least in part on the PDCCH configuration associated with the zone identifier. In an eleventh aspect, alone or in combination with one or more of the first through tenth aspects, transmitting the PDCCH communication comprises transmitting an sPDCCH communication in a search space set of the one or more search space sets, wherein the sPDCCH communication identifies a downlink assignment for a sPDSCH communication.

In a twelfth aspect, alone or in combination with one or more of the first through eleventh aspects, process 500 includes transmitting the sPDSCH communication based at least in part on the downlink assignment, wherein the sPDSCH communication identifies at least one of: one or more other downlink assignments for the UE, or one or more uplink grants for the UE. In a thirteenth aspect, alone or in combination with one or more of the first through twelfth aspects, the downlink assignment for the sPDSCH communication is indicated in sDCI included in the sPDCCH communication.

In a fourteenth aspect, alone or in combination with one or more of the first through thirteenth aspects, a cyclic redundancy check of the sPDCCH communication is masked by a group radio network temporary identifier associated with the UE. In a fifteenth aspect, alone or in combination with one or more of the first through fourteenth aspects, the sPDSCH communication comprises a MAC header that identifies respective C-RNTIs for each of the UE and a plurality of other UEs which are expected to receive a DCI communication, and an aggregation of MAC sub-PDUs, wherein each of the MAC sub-PDUs carries a DCI communication for the UE or one of the plurality of other UEs, and wherein an ordering of respective C-RNTIs in the MAC header of the sPDSCH is consistent with an ordering of the MAC sub-PDUs.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
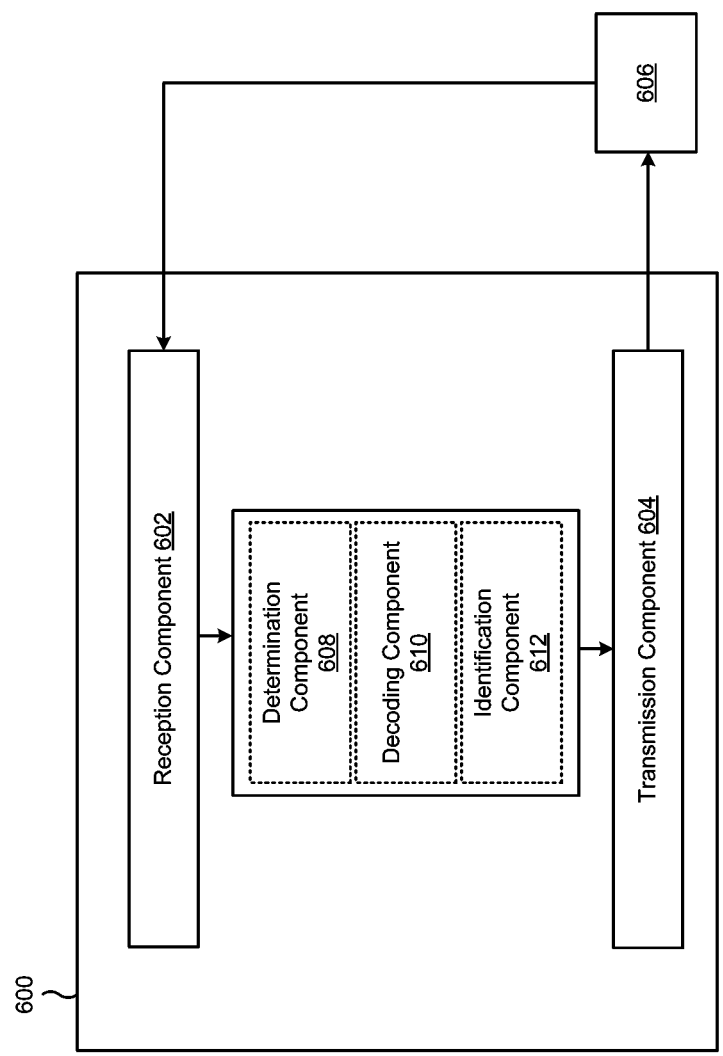
FIGS. 6 and 7 are diagrams of example apparatuses for wireless communication, in accordance with various aspects of the present disclosure.

FIG. 6 is a diagram of an example apparatus 600 for wireless communication in accordance with various aspects of the present disclosure. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include one or more of a determination component 608, a decoding component 610, or an identification component 612, among other examples.

In some aspects, the apparatus 600 may be configured to perform one or more operations described herein in connection with FIGS. 3A-3E. Additionally, or alternatively, the apparatus 600 may be configured to perform one or more processes described herein, such as process 400 of FIG. 4. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The transmission component 604 may transmit UE assistance information to the apparatus 606. The reception component 602 may receive (e.g., from the apparatus 606) an indication of a zone identifier associated with a PDCCH monitoring configuration for RRC connected reduced-capability UEs. The determination component 608 may determine whether a GC-PDCCH communication indicates that the zone identifier is activated for an associated monitoring period. The decoding component 610 may selectively perform one or more PDCCH blind decodes in one or more search space sets associated with the zone identifier during the monitoring period based at least in part on determining whether the GC-PDCCH communication indicates that the zone identifier is activated for the monitoring period.

The transmission component 604 may transmit, based at least in part on receiving a request from the apparatus 606, a communication that identifies at least one of UE capability information associated with the apparatus 600, one or more reference signal measurements, positioning information associated with the apparatus 600, one or more pathloss measurements, or beam management information associated with the apparatus. The identification component 612 may identify an sPDCCH communication based at least in part on the decoding component 610 performing a PDCCH blind decode of the one or more PDCCH blind decodes in a search space set of the one or more search space sets. The identification component 612 may identify, based at least in part on the sPDCCH communication, a downlink assignment for an sPDSCH that carries additional downlink scheduling information or uplink grants for one or more UEs sharing the same Z-RNTI.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
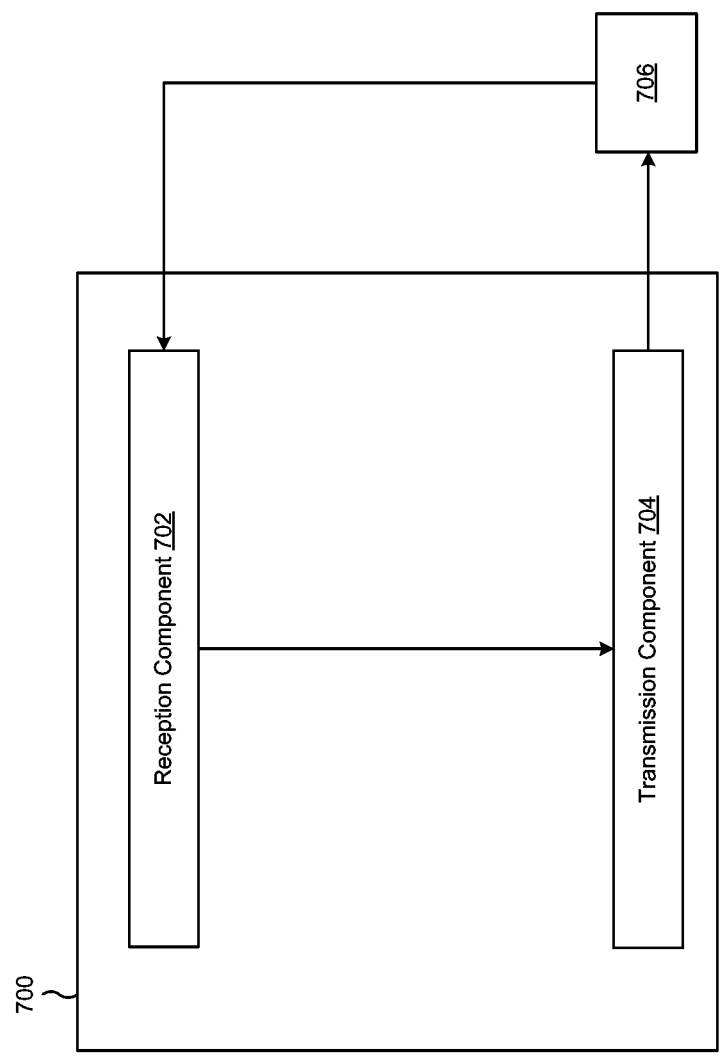

FIG. 7 is a diagram of an example apparatus 700 for wireless communication in accordance with various aspects of the present disclosure. The apparatus 700 may be a BS, or a BS may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704.

In some aspects, the apparatus 700 may be configured to perform one or more operations described herein in connection with FIGS. 3A-3E. Additionally, or alternatively, the apparatus 700 may be configured to perform one or more processes described herein, such as process 500 of FIG. 5. In some aspects, the apparatus 700 and/or one or more components shown in FIG. 7 may include one or more components of the BS described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIO detector, a receive processor, a controller/processor, a memory, or a combination thereof, of the BS described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the BS described above in connection with FIG. 2. In some aspects, the transmission component 704 may be co-located with the reception component 702 in a transceiver.

The transmission component 704 may transmit, to the apparatus 706, a request for UE assistance information and an indication of a zone identifier associated with a sPDCCH monitoring configuration for RRC connected reduced-capability UEs. The transmission component 704 may transmit a GC-PDCCH communication that indicates whether the zone identifier is activated for an associated monitoring period. The transmission component 704 may selectively transmit, based at least in part on whether the GC-PDCCH communication indicates that the zone identifier is activated for the monitoring period, an sPDCCH communication for the apparatus 706 in one or more search space sets associated with the zone identifier during the monitoring period.

The reception component 702 may receive, from the apparatus 706 and based at least in part on transmitting a request to the apparatus 706, a communication that identifies at least one of UE capability information associated with the apparatus 706, one or more reference signal measurements, positioning information associated with the apparatus 706, one or more pathloss measurements, or beam management information associated with the apparatus 706.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of aspects of the present disclosure:

Aspect 1: A method of wireless communication performed by a user equipment (UE), comprising: transmitting UE assistance information to a base station; receiving an indication of a zone identifier associated with a physical downlink control channel (PDCCH) monitoring configuration for radio resource control (RRC) connected reduced-capability UEs; determining whether a group common PDCCH (GC-PDCCH) communication indicates that the zone identifier is activated for an associated monitoring period; and selectively performing one or more PDCCH blind decodes in one or more search space sets associated with the zone identifier during the monitoring period based at least in part on determining whether the GC-PDCCH communication indicates that the zone identifier is activated for the monitoring period.

Aspect 2: The method of aspect 1, wherein the zone identifier is one of a plurality of zone identifiers configured for a serving cell of the base station to which the UE is communicatively connected. Aspect 3: The method of aspect 1 or 2, wherein the PDCCH monitoring configuration is based at least in part on the UE assistance information requested by the base station; and wherein the PDCCH monitoring configuration includes at least one of: a controlResourceSetID parameter that indicates one or more control resource sets that the UE is to monitor, a monitoringSlotPeriodicityAndOffset parameter that indicates a periodicity and an offset for one or more slots in which the UE is to perform PDCCH monitoring, a PDCCH duration parameter that indicates a duration in symbols of a PDCCH for which the UE is to perform PDCCH monitoring, a monitoringSymbolsWithinSlot parameter that indicates a quantity of symbols within each slot in which the UE is to perform PDCCH monitoring, an nrofCandidates parameter that indicates a quantity of PDCCH candidates configured for the UE, or a searchSpaceType parameter that indicates a search space type for the one or more search space sets associated with the zone identifier.

Aspect 4: The method of any of aspects 1-3, wherein transmitting the UE assistance information comprises: transmitting, based at least in part on receiving a request from a base station, the UE assistance information, wherein the UE assistance information identifies at least one of: UE capability information associated with the UE, one or more reference signal measurements, positioning information associated with the UE, one or more pathloss measurements, or beam management information associated with the UE; and wherein receiving the indication of the zone identifier comprises: receiving the indication of the zone identifier based at least in part on transmitting the communication, wherein the zone identifier is semi-persistently configured for the UE by dedicated radio resource control signaling. wherein receiving the indication of the zone identifier comprises: receiving the indication of the zone identifier based at least in part on transmitting the communication, wherein the zone identifier is semi-persistently configured for the UE by dedicated radio resource control signaling.

Aspect 5: The method of any of aspects 1-4, wherein receiving the indication of the zone identifier comprises: receiving the indication of the zone identifier based at least in part on transmitting a UE capability report to the base station, wherein the UE capability report indicates a low mobility for the UE. Aspect 6: The method of any of aspects 1-4, wherein receiving the indication of the zone identifier comprises: receiving an indication of a plurality of zone identifiers based at least in part on transmitting a UE capability report to the base station, wherein the UE capability report indicates a high mobility for the UE.

Aspect 7: The method of any of aspects 1-6, wherein the zone identifier is associated with a zone index or a zone radio network temporary identifier (Z-RNTI); and wherein determining whether the GC-PDCCH communication indicates that the zone identifier is activated for the associated monitoring period comprises: determining whether the GC-PDCCH communication indicates that the Z-RNTI associated with the zone identifier is activated for the associated monitoring period.

Aspect 8: The method of any of aspects 1-7, wherein determining whether the group common PDCCH communication indicates that the zone identifier is activated for the monitoring period comprises: determining that the GC-PDCCH communication does not indicate that the zone identifier is activated for the monitoring period; and wherein selectively performing the one or more PDCCH blind decodes in the one or more search space sets associated with the zone identifier during the monitoring period comprises: refraining from performing the one or more PDCCH blind decodes during the monitoring period based at least in part on determining that the GC-PDCCH communication does not indicate that the zone identifier is activated for the monitoring period.

Aspect 9: The method of any of aspects 1-8, wherein determining whether the group common PDCCH communication indicates that the zone identifier is activated for the monitoring period comprises: determining, based at least in part on a bitmap indicating activation information for a plurality of zone identifiers, that the GC-PDCCH communication indicates that a zone associated with the zone identifier is activated for the monitoring period; and wherein selectively performing the one or more PDCCH blind decodes in the one or more search space sets associated with the zone during the monitoring period comprises: performing, based at least in part on the PDCCH configuration associated with the zone identifier, the one or more PDCCH blind decodes in the one or more search space sets associated with the zone identifier during the monitoring period based at least in part on determining that the GC-PDCCH communication indicates that the zone identifier is activated for the monitoring period.

Aspect 10: The method of aspect 9, further comprising: identifying a short PDCCH (sPDCCH) communication based at least in part on performing a PDCCH blind decode of the one or more PDCCH blind decodes in a search space set of the one or more search space sets; and identifying, based at least in part on the sPDCCH communication, a downlink assignment for a short physical downlink shared channel (sPDSCH) that carries additional downlink scheduling information or uplink grants for one or more UEs sharing the same zone radio network temporary identifier (Z-RNTI).

Aspect 11: The method of aspect 9 or 10, wherein identifying the downlink assignment for the sPDSCH communication comprises: identifying an indication of the downlink assignment for the sPDSCH communication in short downlink control information (sDCI) included in the sPDCCH communication. Aspect 12: The method of any of aspects 9-11, wherein a cyclic redundancy check of the sPDCCH communication is masked by a group radio network temporary identifier associated with one or more UEs.

Aspect 12: The method of any of aspects 9-11, wherein the sPDSCH communication comprises: a medium access control (MAC) header that identifies respective cell radio network temporary identifiers (C-RNTIs) for each of the UE and a plurality of other UEs which are expected to receive a DCI communication, and an aggregation of MAC sub-protocol data units (sub-PDUs), wherein each of the MAC sub-PDUs carries a DCI communication for the UE or one of the plurality of other UEs, wherein a short DCI (sDCI) carried by the sPDSCH uses a same or a different channel coding of a sDCI carried by sPDCCH, and wherein an ordering of the respective C-RNTIs in the MAC header of the sPDSCH is consistent with an ordering of the MAC sub-PDUs.

Aspect 13: A method of wireless communication performed by a base station (BS), comprising: transmitting, to a user equipment (UE), a request for UE assistance information; transmitting, to the UE, an indication of a zone identifier associated with a short physical downlink control channel (sPDCCH) monitoring configuration determined for radio resource control (RRC) connected reduced-capability UEs; transmitting a group common PDCCH (GC-PDCCH) communication that indicates whether the zone identifier is activated for an associated monitoring period; and selectively transmitting, based at least in part on whether the GC-PDCCH communication indicates that the zone identifier is activated for the monitoring period, a sPDCCH communication for the UE in one or more search space sets associated with the zone identifier during the monitoring period.

Aspect 14: The method of aspect 13, wherein the zone identifier is one of a plurality of zone identifiers configured for a serving cell of the base station. Aspect 15: The method of aspect 13 or 14, wherein determining the PDCCH monitoring configuration is based at least in part on the UE assistance information, and wherein the PDCCH monitoring configuration includes at least one of: a controlResourceSetID parameter that indicates one or more control resource sets (CORESETs) that the UE is to monitor, a monitoringSlotPeriodicityAndOffset parameter that indicates a periodicity and an offset for one or more slots in which the UE is to perform PDCCH monitoring, a PDCCH duration parameter that indicates a duration in symbols of a PDCCH for which the UE is to perform PDCCH monitoring, a monitoringSymbolsWithinSlot parameter that indicates a quantity of symbols within each slot in which the UE is to perform PDCCH monitoring, a nrofCandidates parameter that indicates a quantity of PDCCH candidates configured for the UE, or a searchSpaceType parameter that indicates a search space type for the one or more search space sets associated with the zone identifier.

Aspect 16: The method of any of aspects 13-15, further comprising: receiving, from the UE and based at least in part on transmitting a request to the UE, a communication that identifies at least one of: UE capability information associated with the UE, one or more reference signal measurements, positioning information associated with the UE, one or more pathloss measurements, or beam management information associated with the UE; and wherein transmitting the indication of the zone identifier comprises: transmitting the indication of the zone identifier based at least in part on receiving the communication, wherein the zone identifier is semi-persistently configured for the UE by dedicated radio resource control signaling. wherein transmitting the indication of the zone identifier comprises: transmitting the indication of the zone identifier based at least in part on receiving the communication, wherein the zone identifier is semi-persistently configured for the UE by dedicated radio resource control signaling.

Aspect 17: The method of any of aspects 13-16, wherein transmitting the indication of the zone identifier comprises: transmitting the indication of the zone identifier based at least in part on receiving a UE capability report from the UE, wherein the UE capability report indicates a low mobility for the UE. Aspect 18: The method of any of aspects 13-16, wherein transmitting the indication of the zone identifier comprises: transmitting an indication of a plurality of zone identifiers for the UE based at least in part on receiving a UE capability report from the UE, wherein the UE capability report indicates a high mobility for the UE.

Aspect 19: The method of any of aspects 13-18, wherein the zone identifier is associated with a zone index or a zone radio network temporary identifier (Z-RNTI); and wherein the GC-PDCCH communication indicates whether the zone identifier is activated for the associated monitoring period by indicating whether the zone index or Z-RNTI associated with the zone identifier is activated for the associated monitoring period. Aspect 20: The method of any of aspects 13-19, wherein the GC-PDCCH communication does not indicate that the zone identifier is activated for the monitoring period; and wherein selectively transmitting the PDCCH communication in the one or more search space sets associated with the zone identifier during the monitoring period comprises: refraining from transmitting the PDCCH communication during the monitoring period.

Aspect 21: The method of any of aspects 13-20, wherein the GC-PDCCH communication indicates that the zone identifier is activated for the monitoring period; and wherein selectively transmitting the PDCCH communication in the one or more search space sets associated with the zone identifier during the monitoring period comprises: transmitting the PDCCH communication in the one or more search space sets associated with the zone identifier during the monitoring period. Aspect 22: The method of aspect 21, wherein transmitting the PDCCH communication comprises: transmitting the PDCCH communication based at least in part on the PDCCH configuration associated with the zone identifier.

Aspect 23: The method of aspect 21 or 22, wherein transmitting the PDCCH communication comprises: transmitting a short PDCCH (sPDCCH) communication in a search space set of the one or more search space sets, wherein the sPDCCH communication identifies a downlink assignment for a short physical downlink shared channel (sPDSCH) communication. Aspect 24: The method of aspect 23, further comprising: transmitting the sPDSCH communication based at least in part on the downlink assignment, wherein the sPDSCH communication identifies at least one of: one or more other downlink assignments for the UE, or one or more uplink grants for the UE. Aspect 25: The method of any of aspects 21-24, wherein the downlink assignment for the sPDSCH communication is indicated in short downlink control information (sDCI) included in the sPDCCH communication.

Aspect 26: The method of any of aspects 21-25, wherein a cyclic redundancy check of the sPDCCH communication is masked by a group radio network temporary identifier associated with the UE. Aspect 27: The method of any of aspects 21-26, wherein the sPDSCH communication comprises: a medium access control (MAC) header that identifies respective cell radio network temporary identifiers (C-RNTIs) for each of the UE and a plurality of other UEs which are expected to receive a DCI communication, an aggregation of MAC sub-protocol data units (sub-PDUs), wherein each of the MAC sub-PDUs carries a DCI communication for the UE or one of the plurality of other UEs, wherein a short DCI (sDCI) carried by the sPDSCH communication uses a same or a different channel coding as an sDCI carried by the sPDCCH communication, and wherein an ordering of the respective C-RNTIs in the MAC header of the sPDSCH communication is consistent with an ordering of the MAC sub-PDUs.

Aspect 28: An apparatus for wireless communication at a device, comprising a processor; memory coupled with the processor; and instructions stored in the memory and executable by the processor to cause the apparatus to perform the method of one or more aspects of aspects 1-27. Aspect 29: A device for wireless communication, comprising a memory and one or more processors coupled to the memory, the memory and the one or more processors configured to perform the method of one or more aspects of aspects 1-27.

Aspect 30: An apparatus for wireless communication, comprising at least one means for performing the method of one or more aspects of aspects 1-27. Aspect 31: A non-transitory computer-readable medium storing code for wireless communication, the code comprising instructions executable by a processor to perform the method of one or more aspects of aspects 1-27. Aspect 32: A non-transitory computer-readable medium storing a set of instructions for wireless communication, the set of instructions comprising one or more instructions that, when executed by one or more processors of a device, cause the device to perform the method of one or more aspects of aspects 1-27.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting UE assistance information to a base station;
    receiving an indication of a first zone identifier associated with a first physical downlink control channel (PDCCH) monitoring configuration for radio resource control (RRC) connected reduced-capability UEs and indication of a second zone identifier associated with a second PDCCH monitoring configuration for the RRC connected reduced-capability UEs,
        wherein the first PDCCH monitoring configuration indicates a first set of PDCCH monitoring parameters for the RRC connected reduced-capability UEs and the second PDCCH monitoring configuration indicates a second set of PDCCH monitoring parameters for the RRC connected reduced-capability UEs,
        wherein the first set of PDCCH monitoring parameters includes a first parameter that indicates a first search space type for one or more first search space sets associated with the first zone identifier and at least one of:
            a parameter that indicates one or more control resource sets that the UE is to monitor,
            a parameter that indicates a periodicity and an offset for one or more slots in which the UE is to perform PDCCH monitoring,
            a parameter that indicates a duration in symbols of a PDCCH for which the UE is to perform the PDCCH monitoring, or
            a parameter that indicates a quantity of symbols within each slot in which the UE is to perform the PDCCH monitoring,
        wherein the second set of PDCCH monitoring parameters includes a second parameter that indicates a second search space type for one or more second search space sets associated with the second zone identifier, and
        wherein the first set of PDCCH monitoring parameters for the RRC connected reduced-capability UEs and the second set of PDCCH monitoring parameters for the RRC connected reduced-capability UEs are reduced relative to a set of PDCCH monitoring parameters for non-reduced-capability UEs;
    determining whether a group common PDCCH (GC-PDCCH) communication indicates that the first zone identifier or the second zone identifier is activated for an associated monitoring period,
        wherein the GC-PDCCH indicates a first search space set configuration associated with the first zone identifier or a second search space set configuration associated with the second zone identifier,
            wherein the first search space set configuration identifies the one or more first search space sets that are to be monitored by a group of the RRC connected reduced-capability UEs associated with the first zone identifier and the second search space set configuration identifies the one or more second search space sets that are to be monitored by a group of the RRC connected reduced-capability UEs associated with the second zone identifier; and
    selectively performing one or more PDCCH blind decodes in the one or more first search space sets associated with the first zone identifier or the one or more second search space sets associated with the second zone identifier during the associated monitoring period based at least in part on determining whether the GC-PDCCH communication indicates that the first zone identifier or the second zone identifier is activated for the associated monitoring period.

2. The method of claim 1, wherein the first zone identifier and the second zone identifier are included in a plurality of zone identifiers configured for a serving cell of the base station to which the UE is communicatively connected.

3. The method of claim 1, wherein the first PDCCH monitoring configuration is based at least in part on the UE assistance information requested by the base station; and
    wherein the first set of PDCCH monitoring parameters for the RRC connected reduced-capability UEs indicates an early termination of PDCCH blind decoding for the RRC connected reduced-capability UEs relative to the non-reduced-capability UEs.

4. The method of claim 1, wherein transmitting the UE assistance information comprises:
    transmitting, based at least in part on receiving a request from the base station, the UE assistance information; and wherein the UE assistance information identifies at least one of:
UE capability information associated with the UE,
one or more reference signal measurements,
positioning information associated with the UE,
one or more pathloss measurements, or
beam management information associated with the UE; and
wherein receiving the indication of the first zone identifier and the indication of the second zone identifier comprises:
receiving the indication of the first zone identifier and the indication of the second zone identifier based at least in part on transmitting the UE assistance information,
wherein the first zone identifier or the second zone identifier is semi-persistently configured for the UE by dedicated radio resource control signaling.

5. The method of claim 1, wherein receiving the indication of the first zone identifier and the indication of the second zone identifier comprises:
receiving the indication of the first zone identifier and the indication of the second zone identifier based at least in part on transmitting a UE capability report to the base station,
wherein the UE capability report indicates a low mobility for the UE.

6. The method of claim 1, wherein receiving the indication of the first zone identifier and the indication of the second zone identifier comprises:
receiving an indication of a plurality of zone identifiers based at least in part on transmitting a UE capability report to the base station,
wherein the plurality of zone identifiers includes the first zone identifier and the second zone identifier, and
wherein the UE capability report indicates a high mobility for the UE.

7. The method of claim 1, wherein the first zone identifier is associated with a zone index or a zone radio network temporary identifier (Z-RNTI); and
wherein determining whether the GC-PDCCH communication indicates that the first zone identifier or the second zone identifier is activated for the associated monitoring period comprises:
determining whether the GC-PDCCH communication indicates that the Z-RNTI associated with the first zone identifier is activated for the associated monitoring period.

8. The method of claim 1, wherein determining whether the group common PDCCH communication indicates that the first zone identifier or the second zone identifier is activated for the associated monitoring period comprises:
determining that the GC-PDCCH communication does not indicate that the first zone identifier or the second zone identifier is activated for the associated monitoring period; and
wherein selectively performing the one or more PDCCH blind decodes in the one or more first search space sets associated with the first zone identifier or the one or more second search space sets associated with the second zone identifier during the associated monitoring period comprises:
refraining from performing the one or more PDCCH blind decodes during the associated monitoring period based at least in part on determining that the GC-PDCCH communication does not indicate that the first zone identifier or the second zone identifier is activated for the associated monitoring period.

9. A method of wireless communication performed by a base station (BS), comprising:
transmitting, to a user equipment (UE), a request for UE assistance information;
transmitting, to the UE, an indication of a first zone identifier associated with a first short physical downlink control channel (sPDCCH) monitoring configuration determined for radio resource control (RRC) connected reduced-capability UEs and an indication of a second zone identifier associated with a second sPDCCH monitoring configuration for the RRC connected reduced-capability UEs,
wherein the first sPDCCH monitoring configuration indicates a first set of sPDCCH monitoring parameters for the RRC connected reduced-capability UEs and the second sPDCCH monitoring configuration indicates a second set of sPDCCH monitoring parameters for the RRC connected reduced-capability UEs, and
wherein the first set of sPDCCH monitoring parameters includes a first parameter that indicates a first search space type for one or more first search space sets associated with the first zone identifier and at least one of:
a parameter that indicates one or more control resource sets that the UE is to monitor,
a parameter that indicates a periodicity and an offset for one or more slots in which the UE is to perform sPDCCH monitoring,
a parameter that indicates a duration in symbols of a sPDCCH for which the UE is to perform the sPDCCH monitoring, or
a parameter that indicates a quantity of symbols within each slot in which the UE is to perform the sPDCCH monitoring,
wherein the second set of sPDCCH monitoring parameters includes a second parameter that indicates a second search space type for one or more second search space sets associated with the second zone identifier, and
wherein the first set of sPDCCH monitoring parameters for the RRC connected reduced-capability UEs and the second set of sPDCCH monitoring parameters for the RRC connected reduced-capability UEs are reduced relative to a set of PDCCH monitoring parameters for non-reduced-capability UEs;
transmitting a group common PDCCH (GC-PDCCH) communication that indicates whether the first zone identifier or the second zone identifier is activated for an associated monitoring period, wherein the GC-PDCCH indicates a first search space set configuration associated with the first zone identifier or a second search space set configuration associated with the second zone identifier, wherein the first search space set configuration identifies the one or more first search space sets that are to be monitored by a group of the RRC connected reduced-capability UEs associated with the first zone identifier and the second search space set configuration identifies the one or more second search space sets that are to be monitored by a group of the RRC connected reduced-capability UEs associated with the second zone identifier; and
selectively transmitting, based at least in part on whether the GC-PDCCH communication indicates that the first zone identifier or the second zone identifier is activated for the associated monitoring period, a sPDCCH communication for the UE in the one or more first search space sets associated with the first zone identifier or the one or more second search space sets associated with the second zone identifier during the associated monitoring period.

10. The method of claim 9, wherein the first zone identifier and the second zone identifier are included in a plurality of zone identifiers configured for a serving cell of the base station.

11. The method of claim 9, wherein determining the first sPDCCH monitoring configuration is based at least in part on the UE assistance information; and
   wherein the first set of sPDCCH monitoring parameters for the RRC connected reduced-capability UEs indicates an early termination of PDCCH blind decoding for the RRC connected reduced-capability UEs relative to the non-reduced-capability UEs.

12. The method of claim 9, further comprising:
   receiving, from the UE and based at least in part on transmitting a request to the UE, a communication that identifies at least one of:
      UE capability information associated with the UE,
      one or more reference signal measurements,
      positioning information associated with the UE,
      one or more pathloss measurements, or
      beam management information associated with the UE; and
   wherein transmitting the indication of the first zone identifier and the indication of the second zone identifier comprises:
      transmitting the indication of the first zone identifier and the indication of the second zone identifier based at least in part on receiving the communication,
         wherein the first zone identifier or the second zone identifier is semi-persistently configured for the UE by dedicated radio resource control signaling.

13. The method of claim 9, wherein transmitting the indication of the first zone identifier and the indication of the second zone identifier comprises:
   transmitting the indication of the first zone identifier and the indication of the second zone identifier based at least in part on receiving a UE capability report from the UE,
      wherein the UE capability report indicates a low mobility for the UE.

14. The method of claim 9, wherein transmitting the indication of the first zone identifier and the indication of the second zone identifier comprises:
   transmitting an indication of a plurality of zone identifiers for the UE based at least in part on receiving a UE capability report from the UE,
      wherein the plurality of zone identifiers includes the first zone identifier and the second zone identifier, and
      wherein the UE capability report indicates a high mobility for the UE.

15. The method of claim 9, wherein the first zone identifier is associated with a zone index or a zone radio network temporary identifier (Z-RNTI); and
   wherein the GC-PDCCH communication indicates whether the first zone identifier or the second zone identifier is activated for the associated monitoring period by indicating whether the zone index or Z-RNTI associated with the first zone identifier is activated for the associated monitoring period.

16. The method of claim 9, wherein the GC-PDCCH communication does not indicate that the first zone identifier or the second zone identifier is activated for the associated monitoring period; and
   wherein selectively transmitting the sPDCCH communication in the one or more first search space sets associated with the first zone identifier or the one or more second search space sets associated with the second zone identifier during the associated monitoring period comprises:
      refraining from transmitting the sPDCCH communication during the associated monitoring period.

17. A user equipment (UE) for wireless communication, comprising:
   one or more memories; and
   one or more processors coupled to the one or more memories, the one or more processors individually or collectively configured to:
      transmit UE assistance information to a base station;
      receive an indication of a first zone identifier associated with a first physical downlink control channel (PDCCH) monitoring configuration for radio resource control (RRC) connected reduced-capability UEs and an indication of a second zone identifier associated with a second PDCCH monitoring configuration for the RRC connected reduced-capability UEs,
         wherein the first PDCCH monitoring configuration indicates a first set of PDCCH monitoring parameters for the RRC connected reduced-capability UEs,
         wherein the first set of PDCCH monitoring parameters includes a parameter that indicates a first search space type for one or more first search space sets associated with the first zone identifier and at least one of:
            a parameter that indicates one or more control resource sets that the UE is to monitor,
            a parameter that indicates a periodicity and an offset for one or more slots in which the UE is to perform PDCCH monitoring,
            a parameter that indicates a duration in symbols of a PDCCH for which the UE is to perform the PDCCH monitoring, or
            a parameter that indicates a quantity of symbols within each slot in which the UE is to perform the PDCCH monitoring,
         wherein the second set of PDCCH monitoring parameters includes a second parameter that indicates a second search space type for one or more second search space sets associated with the second zone identifier, and
         wherein the first set of PDCCH monitoring parameters for the RRC connected reduced-capability UEs and the second set of PDCCH monitoring parameters for the RRC connected reduced-capability UEs are reduced relative to a set of PDCCH monitoring parameters for non-reduced-capability UEs;
      determine whether a group common PDCCH (GC-PDCCH) communication indicates that the first zone identifier or the second zone identifier is activated for an associated monitoring period,
         wherein the GC-PDCCH indicates a first search space set configuration associated with the first zone identifier or a second search space set configuration associated with the second zone identifier, wherein the first search space set configuration identifies the one or more first search space sets that are to be monitored by a group of the RRC connected reduced-capability UEs associated with the first zone identifier and the second search space set configuration identifies the one or more second search space sets that are to be monitored by a group of the reduced-capability UEs associated with the second zone identifier; and selectively perform one or more PDCCH blind decodes in the one or more first search space sets associated with the first zone identifier or the one or more second search space sets associated with the second zone identifier during the associated monitoring period based at least in part on determining whether the GC-PDCCH communication indicates that the first zone identifier or the second zone identifier is activated for the associated monitoring period.

18. The UE of claim 17, wherein the one or more processors, when determining whether the group common PDCCH communication indicates that the first zone identifier or the second zone identifier is activated for the associated monitoring period, are configured to:

determine, based at least in part on a bitmap indicating activation information for a plurality of zone identifiers, that the GC-PDCCH communication indicates that a first zone associated with the first zone identifier is activated for the associated monitoring period; and wherein the one or more processors, when selectively performing the one or more PDCCH blind decodes in the one or more first search space sets associated with the first zone identifier or the one or more second search space sets associated with the second zone identifier during the associated monitoring period, are configured to:

perform, based at least in part on the first PDCCH monitoring configuration associated with the first zone identifier, the one or more PDCCH blind decodes in the one or more first search space sets associated with the first zone identifier during the associated monitoring period based at least in part on determining that the GC-PDCCH communication indicates that the first zone identifier is activated for the associated monitoring period.

19. The UE of claim 18, wherein the one or more processors are further configured to:

identify a short PDCCH (sPDCCH) communication based at least in part on performing a PDCCH blind decode of the one or more PDCCH blind decodes in a search space set of the one or more first search space sets; and identify, based at least in part on the sPDCCH communication, a downlink assignment for a short physical downlink shared channel (sPDSCH) communication that carries additional downlink scheduling information or uplink grants for one or more UEs sharing a same zone radio network temporary identifier (Z-RNTI).

20. The UE of claim 19, wherein the one or more processors, when identifying the downlink assignment for the sPDSCH communication, are configured to:

identify an indication of the downlink assignment for the sPDSCH communication in short downlink control information (sDCI) included in the sPDCCH communication.

21. The UE of claim 19, wherein a cyclic redundancy check of the sPDCCH communication is masked by a group radio network temporary identifier associated with the one or more UEs.

22. The UE of claim 19, wherein the sPDSCH communication comprises:

a medium access control (MAC) header that identifies respective cell radio network temporary identifiers (C-RNTIs) for each of the UE and a plurality of other UEs which are expected to receive a downlink control information (DCI) communication, and an aggregation of MAC sub-protocol data units (sub-PDUs), wherein each of the MAC sub-PDUs carries a DCI communication for the UE or one of the plurality of other UEs, wherein a short DCI (sDCI) carried by the sPDSCH communication uses a same or a different channel coding of a sDCI carried by the sPDCCH communication, and wherein an ordering of the respective C-RNTIs in the MAC header of the sPDSCH is consistent with an ordering of the MAC sub-PDUs.

23. A base station (BS) for wireless communication, comprising:

one or more memories; and one or more processors coupled to the one or more memories, the one or more processors individually or collectively configured to:

transmit, to a user equipment (UE), a request for UE assistance information;

transmit, to the UE, an indication of a first zone identifier associated with a first physical downlink control channel (PDCCH) monitoring configuration determined for radio resource control (RRC) connected reduced-capability UEs and an indication of a second zone identifier associated with a second PDCCH monitoring configuration for the RRC connected reduced-capability UEs, wherein the first PDCCH monitoring configuration indicates a first set of PDCCH monitoring parameters for the RRC connected reduced-capability UEs, wherein the first set of PDCCH monitoring parameters includes first a parameter that indicates a first search space type for one or more first search space sets associated with the first zone identifier and at least one of:

a parameter that indicates one or more control resource sets that the UE is to monitor, a parameter that indicates a periodicity and an offset for one or more slots in which the UE is to perform PDCCH monitoring, a parameter that indicates a duration in symbols of a PDCCH for which the UE is to perform the PDCCH monitoring, or a parameter that indicates a quantity of symbols within each slot in which the UE is to perform the PDCCH monitoring, wherein the second set of PDCCH monitoring parameters includes a second parameter that indicates a second search space type for one or more second search space sets associated with the second zone identifier, and wherein the first set of PDCCH monitoring parameters for the RRC connected reduced-capability UEs and the second set of PDCCH monitoring parameters for the RRC connected reduced-capability UEs are reduced relative to a set of PDCCH monitoring parameters for non-reduced-capability UEs;

transmit a group common PDCCH (GC-PDCCH) communication that indicates whether the first zone identifier or the second zone identifier is activated for an associated monitoring period,
wherein the GC-PDCCH indicates a first search space set configuration associated with the first zone identifier or a second search space set configuration associated with the second zone identifier, wherein the first search space set configuration identifies the one or more first search space sets that are to be monitored by a group of the RRC connected reduced-capability UEs associated with the first zone identifier and the second search space set configuration identifies the one or more second search space sets that are to be monitored by a group of the RRC connected reduced-capability UEs associated with the second zone identifier; and selectively transmit, based at least in part on whether the GC-PDCCH communication indicates that the first zone identifier or the second zone identifier is activated for the associated monitoring period, a PDCCH communication for the UE in the one or more first search space sets associated with the first zone identifier or the one or more second search space sets associated with the second zone identifier during the associated monitoring period.

24. The BS of claim 23, wherein the GC-PDCCH communication indicates that the first zone identifier is activated for the associated monitoring period; and
wherein the one or more processors, when selectively transmitting the PDCCH communication in the one or more first search space sets associated with the first zone identifier or the one or more second search space sets associated with the second zone identifier during the associated monitoring period, are configured to:
transmit the PDCCH communication in the one or more first search space sets associated with the first zone identifier during the associated monitoring period.

25. The BS of claim 24, wherein the one or more processors, when transmitting the PDCCH communication, are configured to:
transmit the PDCCH communication based at least in part on the first PDCCH monitoring configuration associated with the first zone identifier.

26. The BS of claim 24, wherein the one or more processors, when transmitting the PDCCH communication, are configured to:
transmit a short PDCCH (sPDCCH) communication in a search space set of the one or more first search space sets,
wherein the sPDCCH communication identifies a downlink assignment for a short physical downlink shared channel (sPDSCH) communication.

27. The BS of claim 26, wherein the one or more processors are further configured to:
transmit the sPDSCH communication based at least in part on the downlink assignment,
wherein the sPDSCH communication identifies at least one of:
one or more other downlink assignments for the UE, or
one or more uplink grants for the UE.

28. The BS of claim 26, wherein the downlink assignment for the sPDSCH communication is indicated in short downlink control information (sDCI) included in the sPDCCH communication.

29. The BS of claim 26, wherein a cyclic redundancy check of the sPDCCH communication is masked by a group radio network temporary identifier associated with the UE.

30. The BS of claim 26, wherein the sPDSCH communication comprises:
a medium access control (MAC) header that identifies respective cell radio network temporary identifiers (C-RNTIs) for each of the UE and a plurality of other UEs which are expected to receive a downlink control information (DCI) communication,
an aggregation of MAC sub-protocol data units (sub-PDUs),
wherein each of the MAC sub-PDUs carries a DCI communication for the UE or one of the plurality of other UEs,
wherein a short DCI (sDCI) carried by the sPDSCH communication uses a same or a different channel coding as an sDCI carried by the sPDCCH communication, and
wherein an ordering of the respective C-RNTIs in the MAC header of the sPDSCH is consistent with an ordering of the MAC sub-PDUs.

* * * * *